US012333054B2

United States Patent
Vary et al.

(10) Patent No.: US 12,333,054 B2
(45) Date of Patent: Jun. 17, 2025

(54) TAMPER-EVIDENT STORAGE AND PROVISIONING OF MEDIA STREAMS

(71) Applicant: GENETEC INC., St-Laurent (CA)

(72) Inventors: Julien Vary, Orford (CA); Yannick Laberge, Sherbrooke (CA); Antoine Lennartz, La Prairie (CA); Vincent Beaulieu, Sherbrooke (CA); Pierre Racz, Montreal (CA)

( * ) Notice: Subject to any disclaimer, the term of this patent is extended or adjusted under 35 U.S.C. 154(b) by 231 days.

(21) Appl. No.: 17/817,632

(22) Filed: Aug. 4, 2022

(65) Prior Publication Data

US 2024/0020420 A1 Jan. 18, 2024

Related U.S. Application Data

(60) Provisional application No. 63/389,348, filed on Jul. 14, 2022.

(51) Int. Cl.

| | |
|---|---|
| *H04L 9/32* | (2006.01) |
| *G06F 21/64* | (2013.01) |
| *H04L 9/00* | (2022.01) |
| *H04L 9/08* | (2006.01) |
| *H04L 9/14* | (2006.01) |

(Continued)

(52) U.S. Cl.
CPC ............ *G06F 21/64* (2013.01); *H04L 9/3239* (2013.01); *H04N 21/6582* (2013.01)

(58) Field of Classification Search
CPC .... G06F 21/64; H04N 21/6582; H04N 7/181; H04N 7/183; H04L 9/3239; H04L 9/0825; H04L 9/14; H04L 9/3247; H04L 9/50

See application file for complete search history.

(56) References Cited

U.S. PATENT DOCUMENTS

| 11,423,161 | B1 | 8/2022 | Racz et al. |
| 2019/0044727 | A1* | 2/2019 | Scott ..................... G06F 21/645 |
| 2023/0297701 | A1* | 9/2023 | Mouallem ............... G06F 21/62 |
| | | | 726/30 |

FOREIGN PATENT DOCUMENTS

| WO | 2017/083980 A1 | 5/2017 |
| WO | 2017/083985 A1 | 5/2017 |
| WO | 2021/081630 A1 | 5/2021 |

OTHER PUBLICATIONS

Tampering Detection of Distributed Databases using Blockchain Technology, by Rani et al., published 2019. (Year: 2019).*

(Continued)

*Primary Examiner* — Vu V Tran
(74) *Attorney, Agent, or Firm* — Anglehart et al.

(57) ABSTRACT

The present disclosure relates to systems and methods for tamper-evident storage of a media stream, and for serving tamper-evident media. The tamper-evident media is stored using a data structure comprising a payload field and an associated metadata field. A portion of a media stream is obtained from a media source. A set of parameters, to be stored in the metadata field of the data structure, is determined. A progenitor parameter to associate with the set of parameters is obtained, the progenitor parameter based on a hash of at least part of a previous data structure storing a previous portion of the media stream. The progenitor parameter is incorporated into the set of parameters, and the set of parameters is stored in the metadata field of the data structure. The portion of the media stream is stored in the payload field of the data structure.

24 Claims, 8 Drawing Sheets

(51) Int. Cl.
*H04N 7/18* (2006.01)
*H04N 21/658* (2011.01)

(56) References Cited

OTHER PUBLICATIONS

ARCHANGEL: Tamper-proofing Video Archives using Temporal Content Hashes on the Blockchain, by Bui et al., published 2019. (Year: 2019).*
Corresponding European patent application No. 23185256.7 extended search report dated Dec. 13, 2023.
Ghimire Sarala et al., "Using Blockchain for Improved Video Integrity Verification", IEEE Transactions on Multimedia, IEEE, USA, vol. 22, No. 1, Jan. 1, 2020, pp. 108-121.
Arslan Suayb S et al., "Compress-store on blockchain: a decentralized data processing and immutable storage for multimedia streaming", Cluster Computing, Baltzer Science Publishers, Bussum, NL, vol. 25, No. 3, Mar. 25, 2022, pp. 1957-1968.
Michelin Regio A et al., "Leveraging lightweight blockchain to establish data integrity for surveillance cameras", 2020 IEEE International Conference on Blockchain and Cryptocurrency (ICBC), IEEE, May 2, 2020 (May 2, 2020), pp. 1-3.

* cited by examiner

TAMPER-EVIDENT STORAGE AND PROVISIONING OF MEDIA STREAMS

CROSS-REFERENCE TO RELATED APPLICATION

This patent application claims priority to U.S. Provisional Patent Application No. 63/389,348, filed on Jul. 14, 2022, and entitled "TAMPER-EVIDENT STORAGE OF MEDIA STREAMS." The disclosure of the prior application is considered part of and is incorporated by reference into this patent application.

FIELD

The present disclosure relates generally to digital media, and more specifically to securing digital media.

BACKGROUND

Media recording devices are used in a wide variety of contexts, and it is often desirable to store recorded media for long periods of time to enable later retrieval thereof. Media may be stored in a variety of formats and using any suitable type of storage medium, and indeed may be transferred between media, storage locations, and the like, throughout its lifespan.

In the context of surveillance video or other surveillance media, a particular recording may not appear useful or important at the time it is acquired, but may prove crucial at a later time, whether as part of an investigation, as evidence in a proceeding, or the like. For surveillance media to be admissible, for instance as part of a legal action, authorities may require that a so-called "chain of custody" for the media be demonstrated, whereby the party presenting the media can prove who produced the media, how it was produced, and that it has not been altered until the moment it is presented as evidence, as well as demonstrate that the media has not been altered in any way.

As such, approaches for ensuring that media can be stored in a way to prevent and/or indicate evidence of tampering may be useful.

SUMMARY

The following presents a simplified summary of one or more implementations in accordance with aspects of the present disclosure in order to provide a basic understanding of such implementations, without limiting the embodiments presented within the present disclosure. While existing approaches for media storage, secure and otherwise, are suitable for their purposes, in some cases they may lack suitable security mechanisms, or apply incomplete or circumventable security mechanisms. Conversely, in some cases the security mechanisms used are so elaborate as to impede the responsiveness or speed of the system, or require complex data storage approaches which may limit their usability. As a result, improved approaches for securing digital media may be of interest.

In particular, approaches to securing digital media which are tamper-evident—that is to say, digital media which will display evidence of tampering should such tampering occur—may be of interest in certain particular contexts, such as with surveillance video or similar media. For example, a party wishing to present or enter into evidence a particular piece of digital media may need to prove a chain of custody for the piece of digital media. This may involve demonstrating the source of the piece of digital media, how it was produced, and demonstrating that the piece of digital media has not been altered in any way.

To this end, the present disclosure provides, inter alia, methods, systems, devices, and computer-readable media for tamper-evident storage of a media stream, or other types of digital media.

The operational context for the tamper-evident storage may, in some cases, be a cloud-based environment, wherein the media stream, in whole or in part, is stored in a cloud-based storage system, though other operational contexts are also considered, including local storage environments, as well as so-called "hybrid" environments (which involve both local and cloud systems). Additionally, it should be understood that, while in certain cases, part or all of the disclosed methods, systems, devices, and computer-readable media may operate in a local (i.e., non-cloud) context, when at least part does operate in a cloud context, or when an output is destined for a cloud-based system (storage or otherwise) at some point downstream, the relevant method, system, device, and/or computer-readable medium may still be said to operate in a cloud context.

To store the media stream in a tamper-safe capacity, a data structure which comprises a payload field and an associated metadata filed is used. A portion of the media stream, which can be of any suitable length or size, is obtained from a media source. Then, a set of parameters associated with the portion of the media stream are determined; the set of parameters are to be stored in the metadata field of the data structure, and the portion of the media stream are to be stored in the payload field of the data structure. A progenitor parameter is obtained, which is based on a hash of at least part of a previous data structure storing a previous portion of the media stream, which has already been rendered tamper-evident. Then, the progenitor parameter is incorporated into the set of parameters, which is then stored in the metadata field of the data structure. The portion of the media stream is stored in the payload field of the data structure, such that both the set of parameters and the portion of the media stream, to which the set of parameters is associated, are stored in the same data structure.

In accordance with a broad aspect, there is provided a method for tamper-evident storage of a media stream using a data structure comprising a payload field and an associated metadata field. The method comprises: obtaining a portion of the media stream from a media source; determining a set of parameters to be stored in the metadata field of the data structure, the set of parameters associated with the portion of the media stream to be stored in the payload field of the data structure; obtaining a progenitor parameter to associate with the set of parameters, the progenitor parameter based on a hash of at least part of a previous data structure storing a previous portion of the media stream, the previous data structure having previously been rendered tamper-evident; incorporating the progenitor parameter into the set of parameters and storing the set of parameters in the metadata field of the data structure; and storing the portion of the media stream in the payload field of the data structure.

In at least some embodiments according to any one or more of the previous embodiments, said determining the set of parameters associated with the portion of the media stream comprises generating at least an identifying hash of the portion of the media stream.

In at least some embodiments according to any one or more of the previous embodiments, the method comprises generating a subsequent progenitor parameter based on the set of parameters, including the identifying hash of the portion of the media stream, after said incorporating the progenitor parameter therein, the subsequent progenitor parameter for use in rendering a subsequent portion of the media stream tamper-evident.

In at least some embodiments according to any one or more of the previous embodiments, said generating the identifying hash of the portion of the media stream is performed incrementally as the portion of the media stream is obtained from the media source.

In at least some embodiments according to any one or more of the previous embodiments, said obtaining the progenitor parameter comprises obtaining the progenitor parameter being based on a hash of a previous set of parameters associated with the previous portion of the media stream and stored in the previous data structure.

In at least some embodiments according to any one or more of the previous embodiments, said obtaining the progenitor parameter being based on a hash of a previous set of parameters associated with the previous portion of the media stream comprises the progenitor parameter being based on a hash of a metadata field of the previous data structure storing the previous portion of the media stream.

In at least some embodiments according to any one or more of the previous embodiments, said obtaining the progenitor parameter being based on a hash of a previous set of parameters associated with the previous portion of the media stream comprises the progenitor parameter being based on a hash of the previous portion of the media stream present in the previous set of parameters associated with the previous portion of the media stream.

In at least some embodiments according to any one or more of the previous embodiments, the method comprises, after said incorporating the progenitor parameter into the set of parameters and said storing the set of parameters in the metadata field of the data structure, generating a subsequent progenitor parameter based on the metadata field of the data structure for use in rendering a subsequent portion of the media stream tamper-evident.

In at least some embodiments according to any one or more of the previous embodiments, said determining the set of parameters comprises obtaining a digital signature based on the portion of the media stream and a cryptographic key associated with one of the media source, a media archiver performing said storing the set of parameters and the portion of the media stream, and a user authorizing the tamper-evident storage of the media stream.

In at least some embodiments according to any one or more of the previous embodiments, said storing the set of parameters in the metadata field of the data structure comprises: storing an indirection in the metadata field; and storing the set of parameters in a file separate from the data structure, wherein the indirection points to the file to render the set of parameters accessible via the metadata field.

In at least some embodiments according to any one or more of the previous embodiments, said storing the set of parameters in the metadata field comprises: applying a compression algorithm to the set of parameters to produce a compressed set of parameters; and storing the compressed set of parameters in the metadata field.

In at least some embodiments according to any one or more of the previous embodiments, the method comprises storing a copy of the set of parameters in the payload field in association with the portion of the media stream.

In at least some embodiments according to any one or more of the previous embodiments, the data structure is configured for storing multiple portions of the media stream, wherein said storing the set of parameters in the metadata field of the data structure comprises storing the set of parameters in the metadata field alongside a previous set of parameters associated with the previous portion of the media stream, and wherein said storing of the portion of the media stream comprises storing the portion of the media stream in the payload field alongside the previous portion of the media stream.

In at least some embodiments according to any one or more of the previous embodiments, the method comprises storing a copy of the set of parameters in the payload field in association with the portion of the media stream alongside a copy of the previous set of parameters also stored in the payload field, in association with the previous portion of the media stream.

In at least some embodiments according to any one or more of the previous embodiments, said obtaining the portion of the media stream from the media source comprises acquiring the portion of the media stream as original media.

In accordance with another broad aspect, there is provided a system for tamper-evident storage of a media stream in a cloud-based environment using a data structure comprising a payload field and an associated metadata field. The system comprises: a processor; and a non-transitory computer-readable medium storing thereon instructions. The instructions are executable by the processor for causing the system to perform: obtaining a portion of the media stream from a media source; determining a set of parameters to be stored in the metadata field of the data structure, the set of parameters associated with the portion of the media stream to be stored in the payload field of the data structure; obtaining a progenitor parameter to associate with the set of parameters, the progenitor parameter based on a hash of at least part of a previous data structure storing a previous portion of the media stream, the previous data structure having previously been rendered tamper-evident; incorporating the progenitor parameter into the set of parameters and storing the set of parameters in the metadata field of the data structure; and storing the portion of the media stream in the payload field of the data structure.

In accordance with a further broad aspect, there is provided a method for serving tamper-evident media, the media having previously been stored using at least one data structure comprising a payload field and an associated metadata field. The method comprises: obtaining a request to serve a portion of a media stream; determining, based on the request and at least one set of parameters associated with the media stream, a particular data structure of the at least one data structure, the at least one set of parameters having previously been stored in the metadata field of the at least one data structure; obtaining, from the payload field of the particular data structure, the portion of the media stream to be served; and providing the portion of the media stream.

In at least some embodiments according to any one or more of the previous embodiments, determining the particular data structure to be served comprises consulting a seek table stored in the metadata field.

In at least some embodiments according to any one or more of the previous embodiments, said determining the particular data structure to be served comprises consulting an index generated based on the at least one set of parameters having previously been stored in the metadata field of the at least one data structure.

In at least some embodiments according to any one or more of the previous embodiments, the method comprises, following said consulting the index generated based on the at least one set of parameters, validating the particular data structure to be served based on consulting the at least one set of parameters having previously been stored in the metadata field of the at least one data structure.

In at least some embodiments according to any one or more of the previous embodiments, a plurality of portions of the media stream are stored in a common payload field of a single data structure, wherein the method comprises determining, based on the request and a plurality of sets of parameters associated with respective ones of the plurality of portions of the media stream, a particular one of the portions of the media stream to be provided.

In at least some embodiments according to any one or more of the previous embodiments, the method comprises validating that the portion of the media stream is tamper-free.

In at least some embodiments according to any one or more of the previous embodiments, said validating that the portion of the media stream is tamper-free comprises comparing a progenitor parameter stored as part of the set of parameters in the metadata field, the progenitor parameter based on a hash of at least part of a previous data structure storing a previous portion of the media stream, with a newly generated progenitor parameter generated based on the at least part of the previous data structure, the previous data structure having previously been rendered tamper-evident.

In at least some embodiments according to any one or more of the previous embodiments, the method comprises comparing a plurality of progenitor parameters for each of a plurality of data structures storing the media with a plurality of newly generated progenitor parameters, wherein the plurality of progenitor parameters comprises the progenitor parameters, and wherein the plurality of data structures comprises the at least one data structure.

In at least some embodiments according to any one or more of the previous embodiments, said validating that the portion of the media stream is tamper-free comprises verifying a signature associated with the portion of the media stream.

In at least some embodiments according to any one or more of the previous embodiments, said validating that the portion of the media stream is tamper-free comprises comparing a hash of the portion of the media stream stored as part of the set of parameters in the metadata field with a newly generated hash of the media stream.

In accordance with another broad aspect, there is provided a system serving tamper-evident media, the media having previously been stored using at least one data structure comprising a payload field and an associated metadata field. The system comprises: a processor; and a non-transitory computer-readable medium storing thereon instructions. The instructions are executable by the processor for causing the system to perform: obtaining a request to serve a portion of a media stream; determining, based on the request and at least one set of parameters associated with the media stream, a particular data structure of the at least one data structure, the at least one set of parameters having previously been stored in the metadata field of the at least one data structure; obtaining, from the payload field of the particular data structure, the portion of the media stream to be served; and providing the portion of the media stream.

Additional details and information regarding one or more embodiments, including those described in the preceding paragraphs, are set forth in the accompanying drawings and the description below. Other features and aspects will be apparent from the description and drawings, as well as from the claims.

BRIEF DESCRIPTION OF THE DRAWINGS

For a more complete understanding of the present disclosure, reference is now made to the accompanying drawings.

The following brief descriptions of the drawings should not be considered limiting in any fashion.

It will be noted that throughout the appended drawings like features are identified by like reference numerals.

DETAILED DESCRIPTION

The present disclosure relates to, inter alia, methods, systems, devices, and computer-readable media for tamper-evident storage of a data stream, such as a media stream, or of other types of digital media and to various related methods. For clarity, reference to and discussion of digital media in the present disclosure should be understood as encompassing various manners and form of digital media. The digital media considered herein includes, inter alia, images, video media, audio media, haptic media, and other types of digital media, as appropriate, and may be stored in various formats, depending on the type of digital media. In certain embodiments, the digital media may be stored in standards-compliant formats, whereas in other embodiments, the digital media may be stored in proprietary or custom formats. Additionally, in some embodiments, the digital media may be a media stream, that is to say, a sequence of data elements produced over time, for instance in a continuous fashion, and in some cases substantially in real-time.

Figure 1:
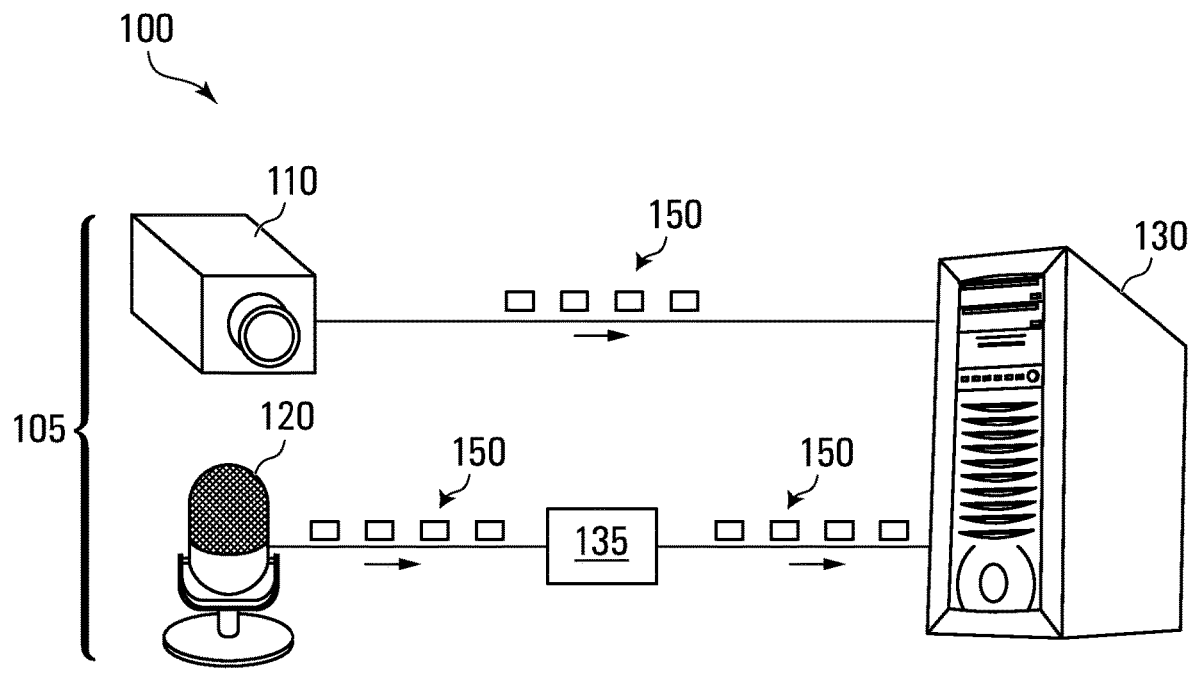
FIG. 1 is a schematic diagram of an example media streaming system.

With reference to FIG. 1, there is illustrated a media streaming system 100. The media streaming system 100 is composed of one or more media sources, illustrated in FIG. 1 as a camera 110 and a microphone 120, and a media storage server 130. The camera 110 and the microphone 120, collectively referred to as the media sources 105, are configured to produce digital media, for instance in the form of media streams 150. Although the present disclosure focuses primarily on embodiments of the media streaming system 100 in which the media sources 105 produce digital media, it should be understood that embodiments in which analog media is produced and then converted to digital media are also considered. Additionally, although only two media sources 105 are illustrated in FIG. 1, it should be understood that the media streaming system 100 may include any number of media sources 105 of any suitable type, including media sources 105 which produce images, video media, audio media, haptic media, and the like. The media sources 105 may include media sources which produce original media, such as the camera 110 and the microphone 120, which record or otherwise acquire digital media by way of suitable sensors. The media sources 105 may additionally, or alternatively, include media sources which playback or otherwise provide previously recorded media, such as hard drives, solid state drives, network-attached storage devices, cloud or other network-based storage systems, media center computers, general purpose computers, or the like.

In some embodiments, the media streaming system 100 may include one or more additional elements, for example one or more devices which mediate the connection between the media sources 105 and the media storage server 130: for instance, a media archiver 135 is coupled to the microphone 120 and to the media storage server 130. It should be noted, however, that other types of devices may be used to mediate the connection between the media sources 105 and the media storage server 130, for instance a gateway, a bridge device, or the like (reference herein to the media archiver 135 should not be construed as limiting or excluding other types of mediating devices). As will be described in greater detail hereinbelow, some media sources 105 are capable of generating a media stream 150 which is already tamper-evident, whereas some other media sources 105 are not. In cases in which a media source is not capable of generating a tamper-evident media stream 150, the media source 105 (e.g., the microphone 120) will generate a media stream 150 which is intercepted by the media archiver 135. The media archiver 135 can then transform the media stream 150 so as to render it tamper-evident, as will be described hereinbelow. Alternatively, the media source 105 may generate a media stream 150 and transmit it to the media storage server 130, which can render it tamper-evident. Other configurations are also considered, including a first media source 105 sending a media stream 150 to a second media source 105, which renders the media stream 150 of the first media source 105 tamper-evident before passing the media stream 150 on to the media storage server 130 for storage. Reference herein to embodiments and examples which discuss the media stream 150 being rendered tamper-evident by the media source 105, or by the media storage server 130, do not exclude cases in which an intermediate device, for instance the media archiver 135, are used to perform the requisite operations to render the media stream 150 tamper-evident.

The media storage server 130 may be any suitable type of device for storing the media streams 150 provided by the media sources 105. The media storage server 130 may be accessible to the media sources 105 over one or more local connections, e.g., via one or more Ethernet cables, one or more local routers, and the like, over one or more remote connections spanning broader networks, e.g., over the Internet, or any suitable combination thereof. In some embodiments, the media storage server 130 may be part of a cloud-based storage service, such as Microsoft® Azure®, Amazon® AWS®, or a similar cloud-based storage service offered by another provider. In some embodiments, the media storage server 130 is an abstraction of several layers of storage, which may include local storage, networked storage, cloud storage, or any suitable combination thereof. In some embodiments, the media storage server 130 is implemented as distributed storage, for instance as a collection or one or more of distributed servers, or in any other suitable fashion. The media storage server 130 may store the media obtained from the media sources 105—provided as the media streams 150—for any number of reasons, including for later playback, for performing analytics or other forms of analysis thereon, for safekeeping of evidence, or the like. As will be described in greater detail hereinbelow, the media storage server 130 may provide stored media, for instance a stored copy of the media obtained from the media sources 105 as part of the media streams 150, to a user or other system, for instance in response to a user request, on the basis of a provisioning schedule, or the like.

To simplify the following discussion, reference will be made to a single media source 105 providing the media stream 150 to the media storage server 130. The media stream 150 may be in any suitable format, and may be converted between formats at different stages, for instance when received at the media storage server 130, as part of the output by the media source 105, or the like. The media stream 150 may be composed of a number of portions, which may be of a various length, size, and/or time duration, depending on the implementation. In some cases, each portion of the media stream 150 may represent a single packet, a group of packets composing a single frame, a group of packets composing multiple frames, for instance the frames between successive keyframes, or the like. Thus, when reference is made herein to a portion of the media stream 150, it should be understood that the "portion" may encompass any suitable part, or all, of a particular media stream.

Additionally, in some embodiments, the data rendered tamper-evident may include or consist of data not conventionally understood as being media data. This may include data streams which are a stream of events data, a stream of changelog data, a stream of sensor data, or of any other suitable type of data. For example, the data stream may be produced by an access controller, which catalogs events relating to access cards being read, access being granted or refused, and the changing status of a door or similar resource controlled by the access controller. By way of another example, the data stream may be produced by a computing device which monitors changes to one or more documents or repositories of documents. Accordingly, in the embodiments and/or examples described herein, the term "media stream" may be replaced with the term "data stream" where appropriate, and references to particular types of media streams, including video streams, audio streams, and the like, may be replaced by references to streams of other types of data, as appropriate.

Figure 2:
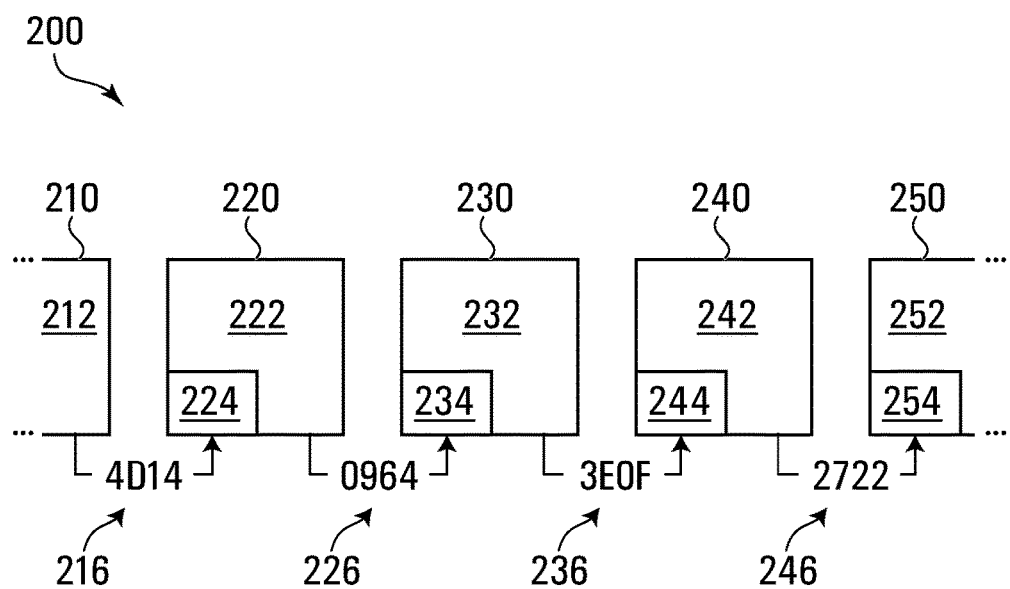
FIG. 2 is a block diagram of an example implementation of a blockchain.

With reference to FIG. 2, an example implementation of a blockchain 200 is illustrated. For the purposes of the present disclosure, the blockchain 200 is shown as being composed of a series of blocks 210, 220, 230, 240, 250 (though it should be understood that the blockchain 200 may include any number of blocks). Each block 210-250 can store any suitable amount of data in a payload portion, indicated here by 212, 222, 232, 242, 252. In many embodiments, the payload portions 212, 222, 232, 242, 252 of the blocks 210, 220, 230, 240, 250 of the blockchain 200 are used to store data relating to transactions, whether the transactions are exchanges of so-called "cryptocurrencies" or more conventional types of assets. In some other embodiments, though, the payload portion is used to store information which a user wishes to render immutable, for instance a contract, a deed or other official record, and the like. Transactions, as well as other information stored in the payload portion 212, 222, 232, 242, 252 of the blocks 210, 220, 230, 240, 250 of the blockchain 200, are typically recorded after validation of a signature of the user or entity storing the information in the blocks 210, 220, 230, 240, 250. Different signature approaches may be used depending on the implementation; in many embodiments, a public key cryptography scheme, using public-private key pairs, is employed. A user wishing to record a transaction (or other information) on the blockchain 200 signs the transaction with their private encryption key. Before accepting the transaction, the entities responsible for the blockchain 200 will validate the signed transaction using the user's public encryption key; only once the transaction is validated is the transaction accepted and incorporated into the blockchain 200. It should be understood that other applications for digital signatures within the blockchain 200 are also considered.

To link each block 210-250 with the preceding block in the chain, each block 210-250 also includes a progenitor field, indicated here by 224, 234, 244, 254 (although not illustrated here, block 210 would also include a progenitor field). The progenitor field 224 of block 220 includes therein a numerical representation 216 of the previous block in the chain, in this case, block 210. The remaining blocks 230-250 similarly contain a numerical representation, indicated here as numerical representations 226, 236, 246, to be stored in their respective progenitor fields 234-254.

Using block 220 as an example, the numerical representation 216 is produced using a particular function or transformation, applied to the block 210, and is then stored in progenitor field 224. In some embodiments, the numerical representation 216 is produced by a hash of block 210, by a hash of part of block 210, by a digitally-signed hash of all or part of block 210, or may be produced using any other suitable function or transformation applied to the block 210. The numerical representation 216 identifies the block 210 and its contents—including the data stored in the payload portion 212 and the data stored in the progenitor field of the block 210—sufficiently uniquely as to ensure that any change in the block 210 or its contents would also result in a change in any newly generated numerical representation 216, using the same function or transformation. Because the numerical representation 216 for the block 210 is stored in the block 220, and thus outside the block 210, any tampering with the block 210 could easily be detected by comparing a newly generated numerical representation 216 with the numerical representation 216 stored in the progenitor field 224 of the block 220. In this fashion, any block 210-250 in the blockchain 200 can be used to verify the integrity of all preceding blocks of the blockchain 200.

Figure 3:
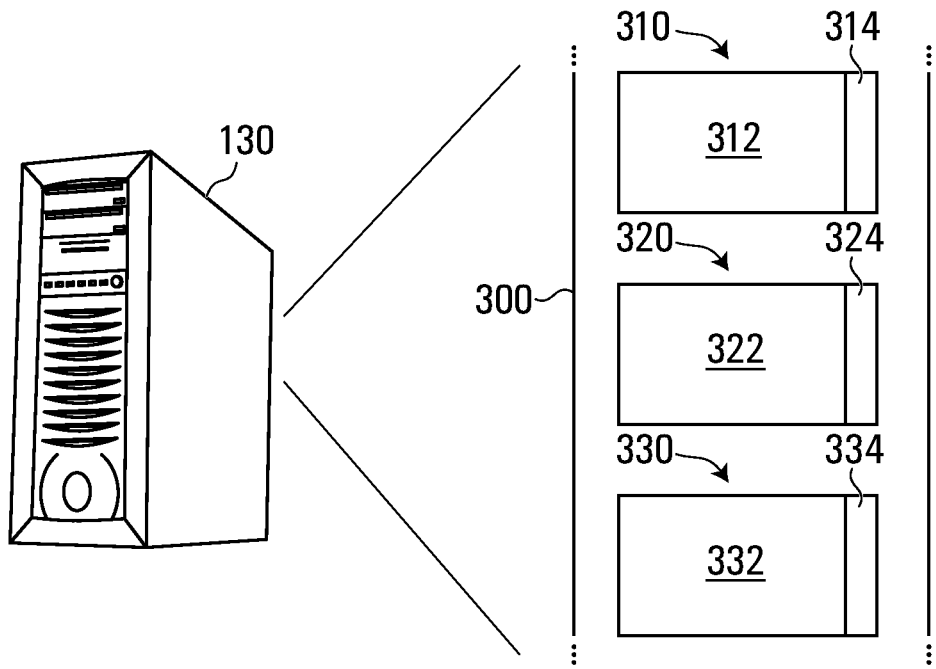
FIG. 3 is a schematic diagram of an example data architecture for tamper-evident media storage.

With reference to FIG. 3, a data architecture 300 for storing digital media within the media storage server 130 is illustrated. The data architecture 300 is composed of a number of data structures 310, 320, 330, each of which includes a payload field 312, 322, 332 and a metadata field 314, 324, 334. The data architecture 300 borrows from the approach illustrated in FIG. 2 to allow for tamper-evident storage of the media streams 150 using, inter alia, successive progenitor blocks to form a blockchain, as well as other tamper-evidencing features, which will be described in greater detail hereinbelow.

In one example implementation, the data architecture 300 is implemented at least in part on a Microsoft® Azure® cloud-based platform, which provides data structures known as Blobs: each Blob can store an arbitrary amount of data in its payload field, and has a metadata field with a fixed size (e.g., 8 KB), in which properties and custom information about the Blob can be stored in the form of name-value pairs. In another example implementation, the data architecture 300 is implemented at least in part on an AWS® Simple Storage Service® cloud-based platform, which provides data structures known as buckets: each bucket can store an arbitrary amount of data in its payload field, and has a metadata field with a fixed size (e.g., 2 KB), in which properties and custom information about the bucket can be stored in the form of name-value pairs. In a further example implementation, the data architecture 300 is implemented using a file system (e.g., ext4 or similar) which supports the storage of extended file attributes (sometimes referred to as xattr) in conjunction with files on a storage medium. Storing properties and other custom information, for instance as name-value pairs, within the extended file attributes effectively allows the extended file attributes to be used as metadata for the files. The storage size available within the extended file attributes may vary from one file system to another; in the case of ext4, the space available in the extended file attributes may be 4 KiB. In a still further example implementation, the data architecture 300 is implemented using forks, for instance the alternate data stream (ADS) functionality of the NTFS™ file system (typically used with the Windows® operating system), whereby multiple data contents can be associated with a single file. The metadata field 314, 324, 334 of the data structures 310, 320, 330 can be stored via a fork, so as to be associated with the file data in the main fork or stream, which represents the payload field 312, 322, 332. In this fashion, the data architecture 300 may be implemented via cloud-based platforms, or by way of locally-operated storage, or by any suitable combination thereof. In a yet further implementation, the particular storage mechanism (file structure, cloud platform, etc.) may not have an implicit system for storing a payload in association with metadata. However, the data architecture 300 may be implemented by way of separate files stored within the storage mechanism, with one file acting as the payload field, and another file acting as the metadata field. The separate files may be associated to one another in any suitable fashion, so as to link the file acting as the payload field with the file acting as the metadata field.

In some embodiments, the media source 105 is configured for packaging the media provided to the media storage server 130 in accordance with the data architecture 300, so that the media stream 150 is composed of data structures similar in form to the data structures 310, 320, 330 of the data architecture 300. Put differently, the media storage server 130 may receive properly formatted data structures from the media source 105, which can be stored in the data architecture 300 as—is, thereby ensuring that the tamper-evident mechanisms present in the data structures 310, 320, 330 (discussed in greater detail hereinbelow) are enforced from the edge of the media streaming system 100. In some cases, the media source 105 receives part or all of the information to be included in the media stream 150 from other sources, and packages the additional information, alongside, for example, original media produced by the media source 105, into properly formatted data structures for storage in the data architecture 300. This may facilitate interplay with media sources 105 which are not configured to generate some of the data necessary for implementation of the data architecture 300, but which can be configured to forward provided metadata as part of the media stream 150.

In some other embodiments, the data architecture 300 may be generated within the media storage server 130, or an intermediary device (e.g., the media archiver 135), in a fashion that is transparent to the end-user and the media source 105. That is to say, the media source 105 may not be aware that the media stream 150 it is providing to the media storage server 130 will be stored within the data architecture 300, and need not package the contents of the media stream 150 in any particular way to facilitate or enable the contents of the media stream 150 to be stored therein. Similarly, users of the media streaming system 100 may not be aware that the digital media being provided by the media sources 105 is being stored by the media storage server 130 within the data architecture 300. For example, a user installs one or more cameras 110, microphones 120, or other media sources 105 and couple the media sources 105 to the media storage server 130 without any particular configuration settings relating to the storage of digital media produced by the media sources 105. Upon receipt of the media stream 150, the media storage server 130 performs the necessary conversions and/or transformations to cause the digital media of the media stream 150 to be stored within the data architecture 300. In still further embodiments, the media source 105 and the media storage server 130 may collaborate to format the digital media, and to produce the data to be stored in the metadata fields 314, 324, 334, in accordance with the data architecture 300.

Figure 4:
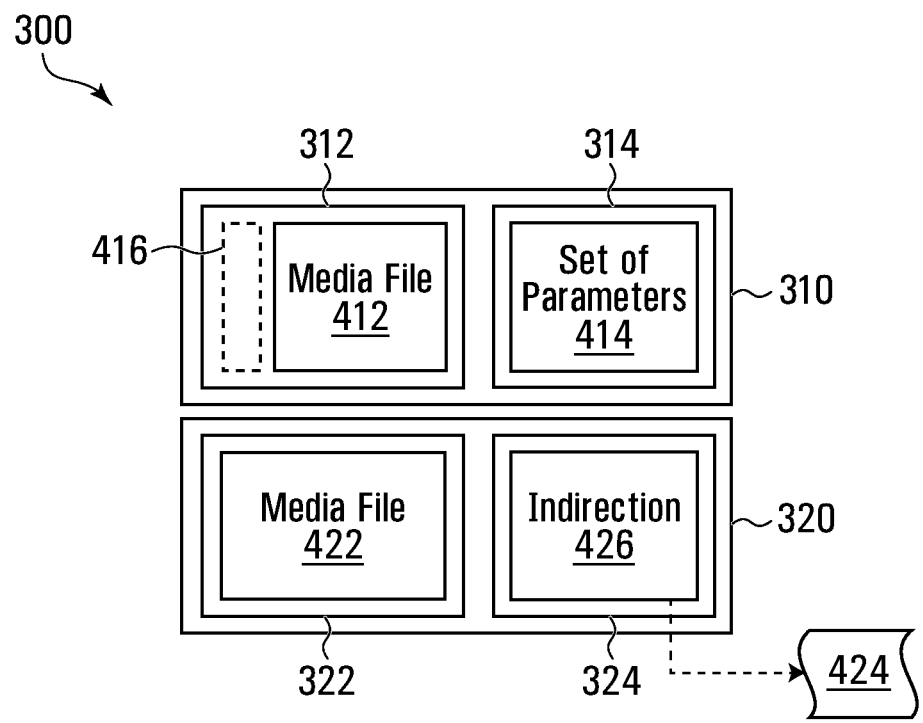
FIG. 4 is a block diagram of example data structures forming the data architecture of FIG. 3.

With reference to FIG. 4, example implementations of the data structures 310, 320 of the data architecture 300 are illustrated: the data structures 310, 320 are used to store portions of the media stream 150 in a tamper-evident manner. Although only the data structures 310, 320 are illustrated in FIG. 4, it should be understood that the data architecture 300 may include any number of data structures. It should also be understood that the data structures 310, 320, as well as any others, could be substantially identical in form, or may vary from one to the next. The data structure 310 stores, in the payload field 312 thereof, a media file 412, which represents a portion of the media stream 150. The media file 412 may be a substantially identical copy to the digital media as provided by the media stream 150, or may be a repackaging or conversion thereof. For example, in some embodiments, the media stream 150 provides video media from the camera 110 in a raw format or similar format. The media storage server 130 converts the raw format video media to a compressed format, for example H.264, H.265, or a similar compression standard, which may be stored in an MP4 container, thereby forming the media file 412. The media file 412 is then stored in the payload field 312 of the data structure 310. The media file 412 can be delimited in any suitable fashion, and thus may represent any suitable portion of the media stream 150. In some cases, the media file 412 is delimited based on being a certain size (i.e., a certain number of bytes). In some other cases, the media file 412 is delimited based on representing a certain time duration (i.e., a certain number of seconds, minutes, or hours) of the media stream 150. Other approaches for delimiting the media file 412 are also considered. For instance, the media file 412 may be delimited based on key frames (also known as "intra-frames" or "i-frames"), based on when the media stream 150 changes to a different scene, or based on when other changes in the media stream take place (different origin, different requestor, different subject, etc.).

The data structure 310 also stores, in the metadata field 314 thereof, a set of parameters 414. The set of parameters 414 can include any suitable number of parameters which are associated with the portion of the media stream 150 stored as the media file 412, which describe, relate to, and/or secure the portion of the media stream 150 as stored in the media file 412. Some of the parameters which compose the set of parameters 414 may be determined or otherwise provided by the media source 105 which provides the media stream 150, and some of the parameters may be determined by the media storage server 130, for instance upon receipt of the media stream 150. As will be described in greater detail hereinbelow, the set of parameters 414 includes therein parameters which facilitate detection of tampering of the media file 412, of other media files in certain others of the data structures in the data architecture 300, and of the set of parameters 414 itself. The set of parameters 414 may also include parameters which facilitate identification of the source of the media file 412, which facilitate playback of the media file 412, which identify the media stream 150, the portion thereof stored as the media file 412, the entity responsible for the media source 105, and the like. In some embodiments, the set of parameters 414 is stored as a number of name/value pairs, that is to say, as combinations of a name of a parameter and a value for said parameter (e.g., "length:: 0h20m30s", "source:: camera_001", etc.), though other approaches for storing the parameters in the set of parameters 414 are also considered. The set of parameters 414 may be assembled by the media storage server 130 at any suitable time: in some embodiments, the set of parameters 414 may be fully assembled at or before the time at which the media file 412 is stored in the payload field 312, and in some other embodiments, the set of parameters 414 may only be fully assembled at some time after the media filed 412 is stored in the payload field 312.

In some embodiments, additional information may also be stored in the payload field 312 and/or in the metadata filed 314. For instance, in some embodiments, the payload field 312 also stores a copy 416 of the set of parameters 414. By storing the set of parameters 414 in the payload field 312, in the form of the copy 416, a party wishing to perform playback of the portion of the media stream 150 stored as the media file 412 may, by downloading the payload field 312 of the data structure 310 and not the metadata field 314, nevertheless acquire both the media file 412 and the set of parameters 414. In this fashion, a single operation or interaction with the data architecture 300 allows the party to obtain both the media file 412 and the set of parameters 414, thereby reducing the number of interactions with the data architecture 300 required to acquire the desired data. This approach may be of interest in cloud-based environment which limit the number of interactions that can be performed on stored data, or which adjust the cost of hosting data based on how frequently the data is the subject of interactions. In some other cloud-based environments, both the media file 412 and the set of parameters 414 may be acquired in a single request to the media storage server 130, with the request specifying that the data in the payload field 312 and in the metadata field 314 be returned.

In some embodiments, the set of parameters of a particular portion of the media stream 150 may be stored indirectly in the metadata field 314. For example, the data structure 320 stores another portion of the media stream 150 as media file 422 in its payload field 322, but a set of parameters 424 relating to the portion of the media stream 150 stored as media file 422 may be stored outside the data structure 320. Instead, the metadata field 324 of the data structure 320 stores an indirection 426—sometimes referred to as a shortcut or a symbolic link (symlink)—which points to the location at which the set of parameters 424 is stored. The set of parameters 424 may be stored indirectly in the metadata field 324 in situations in which the set of parameters 424 would occupy more storage space (i.e., more bytes) than is available in the metadata field 324, in which writing the set of parameters 424 to the metadata field 324 (or reading the set of parameters 424 from the metadata field 324) would be too slow of an operation, or in other appropriate situations. Another approach that may be employed in certain embodiments, for instance when a particular set of parameters would occupy more storage space than is available in a relevant metadata field, is to apply a compression algorithm to the particular set of parameters to produce a compressed set of parameters. Thus, for instance, the set of parameters 414 stored in the metadata field 314 may be compressed via a compression algorithm prior to being stored in the metadata field 314. In such cases, the copy 416 of the set of parameters 414 may be uncompressed, or may also be compressed, depending on the particulars of the implementation.

As noted hereinabove, the media storage server 130 may also serve the digital media stored therein for playback, transfer, or the like, whether to a third-party computing device requesting digital media from the media storage server 130, or at the media storage server 130 itself, which may be configured for receiving user input to request playback of certain media. Requests to the media storage server 130 to provide digital media stored therein may be sent from any suitable device, including internally to the media storage server 130, for instance based on pre-established schedules or the like, and the request may take any suitable form. Upon receipt of a request to provide digital media, the media storage server 130 can search the metadata fields of the various data structures 310, 320, 330, to locate the appropriate digital media to server to the requestor. By way of an example, when a particular request specifies that video from a particular camera is desired (e.g., from a camera identified as "camera_012"), the media storage server 130 can use camera identifiers stored in the metadata fields 314, 324, 334 to identify the appropriate one of the data structures 310, 320, 330 from which to acquire the digital media to provide to the requestor. By way of another example, when a particular request specifies that video taken at a particular moment in time is desired (e.g., from 9 PM on a particular Tuesday), the media storage server 130 can use timestamps or recording times stored in the metadata fields 314, 324, 334 to identify the appropriate one of the data structures 310, 320, 330 from which to acquire the digital media to provide to the requestor. By way of a further example, when a particular request specifies a particular location (e.g., as latitude/longitude coordinates, by a civil address, or the like), the media storage server 130 can use location data stored in the metadata fields 314, 324, 334, in some cases in cross-reference with maps or similar geographical information, to identify cameras near the specified location, and in turn to identify the appropriate one of the data structures 310, 320, 330 from which to acquire the digital media to provide to the requestor.

When providing the media to the requestor, the media storage server 130 provides the data stored in the relevant payload field 312, 322, 332 to the requestor. In some embodiments, the media storage server 130 also provides the data stored in the related metadata field 314, 324, 334. In some other embodiments, for instance the embodiment of data structure 310 (in which the copy 416 of the set of parameters 414 is also stored in the payload field), the media storage server 130 can provide both the media file 412 and the set of parameters 414 (as present in the copy 416) by supplying the payload field 312 to the requestor. In this fashion, the number of operations performed on the data architecture 300 can be reduced by storing the copy 416 in the payload field 312.

Figure 5A:
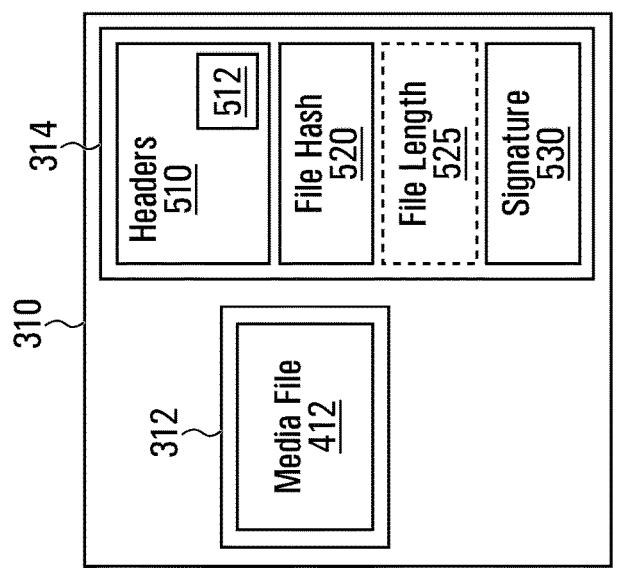
FIG. 5A is a block diagram of an example implementation of one of the data structures of FIG. 4.

With reference to FIG. 5A, an example of the set of parameters 414 is illustrated as being composed of a number of categories: headers 510, a file hash 520, a signature 530, and in some embodiments a file length 525. It should be understood, however, that the division of the set of parameters 414 shown in FIG. 5A is for the purposes of illustration, and does not necessarily mean that the set of parameters 414, as physically stored within the metadata field 314, are subdivided into specific categories or the like. Indeed, the set of parameters 414 may include additional or fewer categories of parameters, and the parameters themselves may be stored within the metadata field 314 in any suitable fashion, depending on the implementation.

The headers 510 are composed of various parameters which provide identifying information about the media file 412 and information to facilitate playback of the media file 412. For example, the headers 510 may include any one or more of a unique identifier for the media stream 150, a unique identifier for the source of the media stream 150 (e.g., the relevant media source 105), a unique identifier for groups or families of media streams 150 which may be related to one another, one or more timestamps associated with the portion of the media stream 150 which is stored as the media file 412, a length, size, or duration of the media file 412, and the like. By way of another example, the headers 510 include the location (e.g., timestamps) of one or more keyframes of the media file 412, to facilitate playback of and seeking within the media file 412. Additionally, the headers include at least a progenitor parameter 512; as described in relation to FIG. 2, a progenitor in a blockchain is a numerical representation of the previous block in the chain. In this fashion, the progenitor parameter 512 is based on the previous data structure of the data architecture 300. Thus, the progenitor parameter for the data structure 330 would be based on at least part of the data structure 320, the progenitor parameter for the data structure 320 would be based on at least part of the data structure 310, and the progenitor parameter 512 for the data structure 310 would be based on at least part of some previous data structure in the data architecture 300. It should be noted that each subsequent data structure of the data architecture 300 stores a subsequent portion of the media stream 150. As a result, the progenitor parameter for a particular data structure is based on at least part of a previous data structure in the data architecture 300, which stores a previous portion of the media stream 150.

The progenitor parameter 512 can be any suitable numerical representation of the previous data structure, including being based on a hash of part or all of the previous data structure, using any suitable hashing algorithm. In some embodiments, the progenitor parameter 512 is obtained by hashing the previous data structure as a whole. For example, the progenitor parameter for the data structure 320 is obtained by hashing the data structure 310 as a whole. In some other embodiments, the progenitor parameter 512 is obtained by hashing a particular portion of the previous data structure. By way of an example, the progenitor parameter 512 is obtained by hashing the metadata field of the previous data structure. By way of another example, the progenitor parameter 512 is obtained by hashing a subset of the metadata field of the previous data structure, for instance the header of the previous data structure. Other approaches for generating the progenitor parameter 512 are also considered.

Approaches in which the progenitor parameters, including the progenitor parameter 512, are obtained by hashing part or all of the data in the metadata field 314 may, in certain cases, provide certain benefits over approaches in which the progenitor parameters are obtained by hashing larger portions of the data structures 310, 320, 330. Because the metadata field of any given data structure 310, 320, 330 is likely to be of a smaller size than the payload field, hashing the metadata field may be a less computationally- and time-intensive operation, thus simplifying the task of generating the progenitor parameter. This may be of particular interest when rewinding, browsing, or validating the blockchain of the data architecture 300: rather than recomputing progenitor parameters by hashing large amounts of data present in the payload fields 312, 322, 332, only the data of the metadata fields 314, 324, 334 is used to recompute the progenitor parameters. Additionally, in cases where the media files 412, 422, 432 are moved off-chain (i.e., deleted from the payload fields 312, 322, 332, for instance to reduce storage costs), the metadata fields 314, 324, 324 can be retained to keep the blockchain intact, and thus suitable for ensuring that the contents of the media stream 150 previously stored in the data architecture 300 are free from tampering. In cases in which the duration of the media stream 150 to be stored in the payload fields 312, 322, 332 is not predetermined, certain parameters to be stored in the metadata field 314, as part of the set of parameters 414, may be unknown (e.g., the length or size of the media file 412). If the subsequent progenitor parameter for the data structure 310 is based only on data stored in the metadata field 314, it may be computationally feasible to re-update the sets of parameters of the data structures 310, 320, 330 of the data architecture 300 at a time after storing the portions of the media stream 150, since the computationally intensive hashing of the media files (e.g., the media file 412) has already been performed and stored in the file hash 520. This may also facilitate linear storage of multiple media files 412, since the sets of parameters 414 are stored separately in the metadata field(s) 314.

Of course, once the data structure 310 has the media file 412 and the set of parameters 414 stored therein, a subsequent progenitor parameter, for instance for the data structure 320, may be generated in accordance with any of the previously-described embodiments. Notably, in embodiments in which the subsequent progenitor is generated based on the set of parameters 414 stored in the metadata field 314, the subsequent progenitor is based on the file hash 520, the progenitor 512, the signature 530, and in some embodiments, the file length 525. As a result, the subsequent progenitor can be used to detect tampering in both the media file 412 (due to changes in the media file 412 affecting the file hash 520, and therefore the subsequent progenitor), in the set of parameters 414 (due to changes in the set of parameters affecting the subsequent progenitor), and attempted tampering with the data architecture 300 as a whole (due to the inability to produce new signatures using the same cryptographic key as the one used to produce the signatures 530).

The set of parameters 414 also includes the file hash 520, which is a hash of part or all of the media file 412 (for simplicity, the foregoing discussion will refer to the file hash 520 as being a hash of the media file 412, though this should not be understood as limiting). By storing a hash of the media file 412 within the set of parameters 414, any tampering with the media file 412 would be detectable by comparing a new hash of the media file 412 with the file hash 520 stored in the metadata field 314 as part of the set of parameters 414. In some embodiments, the file hash 520 may be an incremental hash (e.g., obtained using the IncrementalHash class of the .NET™ API by Microsoft®): as the media file 412 is stored in the payload field 312, concurrently with the media stream 150 being received at the media storage server 130, the stored portions of the media file 412 may be hashed to progressively generate the file hash 520 in increments. In this fashion, the hashing of the media file 412 can begin prior to the totality of the media file being stored in the payload field 312, which may reduce the amount of time required to complete generating the set of parameters 414. In some embodiments, the particular hashing function used may be selected to avoid certain potential vulnerabilities or attack vectors, for instance a length extension attack, or the like.

In some embodiments, the set of parameters 414 also includes the file length 525. Illustrated here as a separate element within the set of parameters 414, in some embodiments the file length 525 may be included as part of the headers 510, whereas in some other embodiments, the file length 525 is stored within the metadata field 314 separately from the headers 510. The file length 525 is a value of the length of the media file 412, as stored within the payload field 312. The file length 525 may represent the length of the media file 412 in any suitable fashion, using any suitable numerical representation, as appropriate. In some cases, the presence of the file length 525 may be used to assess what proportion of the media stream 150 was successfully saved into the media file 412, for instance in cases in which transfer of the media stream 150 to the media storage server 130 is interrupted.

The set of parameters 414 also includes the signature 530, which is a digital signature produced using a cryptographic key or other cryptographic secret of an authority which certifies the authenticity of the media stream 150 and/or the media file 412. The signature 530 may be produced using any suitable approach, depending on the implementation. In some embodiments, the signature 530 is produced by applying the cryptographic key to a hash of some or all of the remaining data stored as part of the set of parameters 414 in the metadata field 314. For example, a hash of the headers 510, the file hash 520, and, in some embodiments, the file length 525, may be signed using the aforementioned cryptographic key. This approach may, as described hereinabove, assist in rendering the set of parameters 414 tamper-evident, as changes to the set of parameters 414 would be detectable via a comparison to the signature 530, and the signature 530 would not be reproducible without the cryptographic key used to generate it.

In some other embodiments, the signature 530 may additionally, or alternatively, be obtained by encrypting a hash of the media file 412 with a cryptographic key. The hash of the media file 412 used to produce the signature 530 may be the same hash stored as the file hash 520, or may be a different hash. For instance, the signature 530 may generated using a hash of a portion of the media file 412, whereas the file hash 520 may be a hash of the whole of the media file 412. Other approaches are also considered.

In some embodiments, the signature 530 is produced using the private encryption key of the media source 105 which produced the media stream 150, for instance embodiments in which the media source 105 is provided with a strong identity. The signature 530 is provided to the media storage server 130 concurrently with the media stream 150, so that the media storage server 130 can store portions of the media stream 150 as media files 412, and store the concurrently-provided signatures from the media source 105 as the signature 530. In some other embodiments, the signature 530 is produced using the private encryption key of the media storage server 130 or of an archiver operating separately from or as part of the media storage server 130, for instance upon receipt of the media stream 150 by the media storage server or the archiver. In some further embodiments, the media source 105 and/or the media storage server 130 are configured for being operated by specific users, for instance by logging into the media source 105 or the media storage server 130, by providing the media source 105 or the media storage server 130 with a physical security token (e.g., a Yubikey™), or the like, and the signature 530 may be produced using a private encryption key associated with the user, for instance a private encryption key stored on the user's Yubikey. Other approaches for generating the signature 530, using any other suitable asymmetric encryption approach, are also considered.

As mentioned hereinabove, the file hash 520 may be generated incrementally, as the media file 412 is stored in the payload field 312. In some embodiments, other parts or all of the set of parameters 414 may also be generated as the media file is stored in the payload field 312. Put differently, the set of parameters 414, in whole or in part, may be generated over multiple iterations during the acquisition of the media stream 150 which is stored as the media file 412. For example, some or all of the headers 510 may be generated early in the acquisition process of the media stream 150, for instance substantially concurrently with receiving the first or first few packets of the media stream 150. Others of the headers 510 may be changed over the course of receiving the media stream 150, for instance elements within the headers 510 relating to the length, duration, etc. of the media file 412. By way of another example, the file length 525 and the signature 530 may be recomputed periodically during the course of receiving the media file 412. Thus, the file length 525 may be re-evaluated and modified as the media stream 150 is being received and stored as the media file 412, and the signature 530 may be re-generated periodically in response to changes in the headers 510, the file hash 520, the file length 525, and the like.

Thus, in some embodiments, the various elements of the set of parameters 414—including the header 510, the file hash 520, the file length 525, and the signature 530— collaborate to render the media file 412, as well as the data structure 310, tamper-evident in at least the following ways. First, tampering with the media file 412 directly can be detected based on the file hash 520 and/or the file length 525 stored in the metadata field 314: if the media file 412 is changed, a newly generated hash of the media file 412 would differ from the file hash 520, and/or the length of the media file 412 would not match the value stored in file length 525, thereby evidencing the tampering. Second, tampering with the headers 510 and/or the file hash 520 can be detected based on the signature 530 stored in the metadata field 314: because the signature 530 is generated by applying a cryptographic key to a hash of the headers 510 and the file hash 520, if the headers 510 and/or the file hash 520 are changed, a newly generated signature generated in the same manner would differ from the signature 530, thereby evidencing the tampering.

Additionally, depending on the implementation, it may be difficult or impossible to obtain the cryptographic key used to produce the original signature 530, serving as a further defense against tampering with the headers 510 and/or the file hash 520. Third, tampering with any part of data structures preceding a particular one of the data structures, (e.g., preceding to the data structure 310) can be detected based on the progenitor parameter 512 stored in the headers 510: if one or more of the preceding data structures are changed, a newly generated progenitor parameter would differ from the progenitor 512, thereby evidencing the tampering. Similarly, tampering with the data structure 310 can be detected using the progenitor parameter stored in the data structure 320. Moreover, attempted tampering with the whole of the blockchain formed by the metadata fields of the data structures of the data architecture 300 can be detected by validating the signatures 530, which cannot be replicated without access to the private key(s) of the media source(s) 105 which produced the media stored in the data architecture 300.

Validation of media stored in the data architecture 300 can therefore be performed on these basis, namely by producing new hashes, signatures, progenitors, or the like, and comparing with those already stored as part of the data architecture 300. Additionally, in cases in which the tamper-evident mechanism involves a digital signature, a certificate associated with the signing authority can be used to validate the signature. For example, a certificate associated with the media source 105 can be used to validate the signature 530 of the data structure 310. The certificate may be provided alongside the media field 412 when served to a requesting entity, so that the requesting entity may itself also validate that the signature 530 is valid. In certain cases, because the sets of parameters are stored in the metadata fields 314, 324, 334 of the data structures 310, 320, 330, separately from the media stored in the payload fields 312, 322, 332, the metadata field 314, 324, 334 can be extracted from the data architecture 300 (or copied therefrom) to be provided to a third-party or other external part to audit or otherwise validate the data architecture 300. Moreover, the data architecture 300 as a whole can be validated based on the blockchain formed by the metadata fields of the data structures of the data architecture 300.

In some embodiments, validation of media files (e.g., the media file 412) can be performed upon ingestion by the media storage server 130. For example, the media source 105 can produce the media stream 150 as a plurality of data structures 310, 320, 330, which are then sent to the media storage server 130. Upon receipt, the media storage server can perform one or more of the above-described validations on the media stream, prior to storing the data structures 310, 320, 330 within the data architecture 300. This may be referred to as performing "in-line" validation. In some other embodiments, similar validations of the media file 412 can be performed after ingestion, at any suitable time.

Figure 5B:
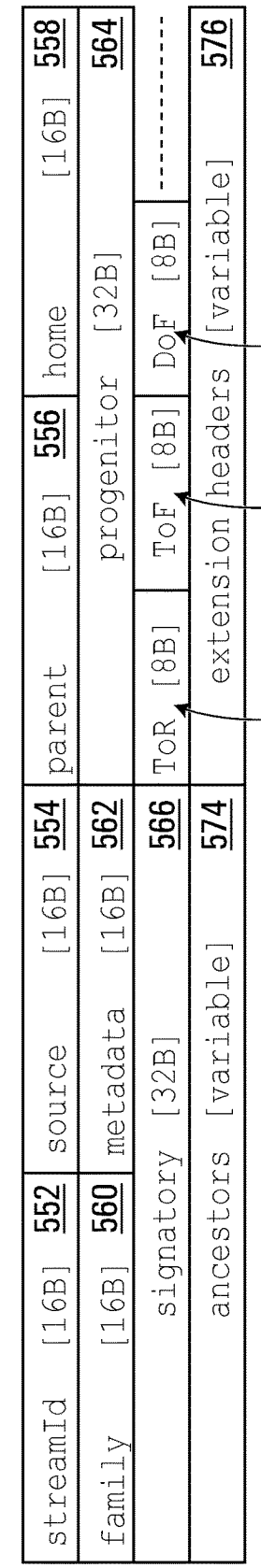
FIG. 5B is an example representation of the headers of the data structure of FIG. 5B.

With additional reference to FIG. 5B, a non-limiting example of the headers 550 is illustrated, and is described in relation to the data structure 310. The headers 550 include a streamId 552, which is a universally-unique identifier (UUID) which identifies the stream to which the data structure 310 belongs. The headers 550 also include a source 554, which is a UUID representing the physical source of the information in the data structure 310 (e.g., a UUID associated with the CMOS sensor or a microphone of the camera 110, a UUID associated with the transducer of the microphone 120, etc.). In this fashion, the source 554 represents the edge-most producer of the data architecture 300. Depending on the particular application, the context in which the source 554 is used will vary. In some embodiments, additional information relating to the physical source of the information in the data structure 310 may be stored in a separate data architecture. For instance, configuration data relating to the media source 105 and/or the physical sources of the media stream 150 may be stored in a separate data architecture, which is also assigned the same UUID as that used for the source 554 in the data architecture 300, relating to the media produced by the media source 105 and/or the physical sources of the media stream 150. The headers 550 also include a parent 556, which serves to indicate a logical hierarchy between different data architectures. The inclusion of the parent 556 gives data architectures a recursive nature, and a given data architecture will generally have a single parent 556 during its lifetime. For example, a first data architecture stores an original or "clean" version of a video file, and a second data architecture stores a modified version of the video files, in which a privacy blurring effect is applied to the persons depicted in the video. In this example, the second data architecture will indicate the first data architecture as its parent 556, and the first data architecture will indicate a null value in the parent 556. The headers 550 also include a home 558, which is a UUID representing an authority on the state of a set of data architectures. In certain embodiments, the home 558 indicates which of the data structures in the data architecture 300 is currently at the head of a group of data architectures, and can be used to identify the latest data structure in the group of data architectures. The headers 550 also include a family 560, which is a UUID indicating the family to which the data architecture 300 belongs. In some embodiments, families are an administrative hierarchy. The headers 550 also include a metadata 562, which is a UUID identifying the stream of metadata (i.e., a separate data architecture which stores only metadata) associated with the data architecture 300. The headers 550 also include a progenitor 564, which is a hash of the data structure preceding the data structure 310 in the data architecture 300. For example, the hash may be a SHA256 hash. The headers 550 also include a signatory 566, which is a certificate thumbprint for the certificate containing the signing key for the data structure 310. The certificate itself can be found through any suitable approach, for instance based on relevant metadata. For example, the signatory 566 may be generated using SHA256, SHA1, or any other suitable approach. The headers 550 also include a time of record (ToR) 568, which is a timestamp at which the data structure 310 was created, which may follow any suitable timekeeping standard. The headers 550 also include a time of fact (ToF) 570, which is a timestamp representing a start time for the portion of the media stream stored in the media file 412. The headers 550 also include a duration of fact (DoF) 572, which is a value indicating the duration between the start time for the portion of the media stream 150 stored in the media file 412, as indicated by the ToF 570, and the end time for the portion of the media stream stored in the media file 412. Put differently the DoF 572 is an indication of the length of the portion of the media stream 150 stored in the media file 412. The headers 550 also include ancestors 574, which is a list of data structure identifiers (e.g., hashes of previous data structures within the data architecture 300, which may need to be re-merged into the blockchain of the data architecture 300) used for resolving potential forks in the chain of data structures 310, 320, 330. Additionally, the headers 550 may include one or more extension headers 576, which may include any additional information necessary for properly storing and/or performing playback of the media file 412, for instance as described previously in relation to FIG. 4.

Figure 6A:
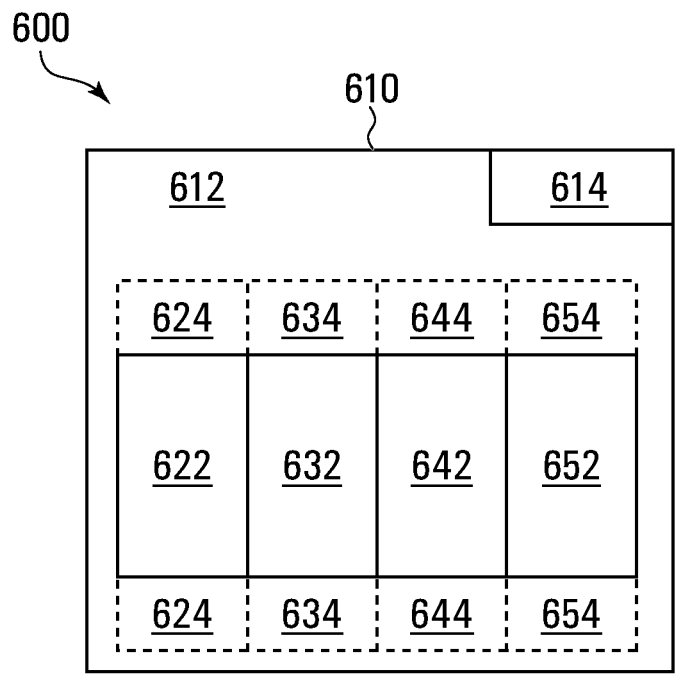
FIG. 6A is a block diagram of an example data structure forming the data architecture of FIG. 3.

With reference to FIG. 6A, another embodiment of a data architecture 600 for tamper-evident storage of media is illustrated as including a data structure 610 composed of a payload field 612 and a metadata field 614. It should be noted that the data architecture 600 may include any suitable number of data structures, though FIG. 6A illustrates only the data structure 610. In certain cloud environments, storing the same amount of data in a single data structure (e.g., a single Microsoft® Azure® blob) may be more cost-effective, result in faster access times, and/or facilitate streaming-based playback of the data vis-à-vis storing the data in multiple data structures. To this end, the payload field 612 is configured for storing multiple portions of the media stream 150 therein, illustrated here as media files 622, 632, 642, 652. Each media file 622, 632, 642, 652 may be of any suitable length, size, or duration, and successively stored ones of the media files 622, 632, 642, 652 may be temporally subsequent to one another. In some embodiments, the media files 622, 632, 642, 652 may be of substantially similar length, size, or duration, or may of varying length, size, or duration, as appropriate. Additionally, the metadata field 614 is used for storing sets of parameters associated with each of the media files 622, 632, 642, 652: the metadata field 614 may store the sets of parameters in a concatenated fashion, in a compressed fashion, or the like.

In some embodiments, the payload field 612 itself may implement an internal data structure for storing therein copies of the sets of parameters 624, 634, 644, 654 for each of the media files 622, 632, 642, 652. The copies of the sets of parameters 624, 634, 644, 654 may be stored, as part of the internal data structure, in conjunction with their respective media file 622, 632, 642, 652, for instance so that the set of parameters 624 is disposed logically ahead of the media file 622 to which it relates, and so on. In some embodiments, in addition to storing the copies of the sets of parameters 624, 634, 644, 654 ahead of the media files 622, 632, 642, 652, copies of the sets of parameters 624, 634, 644, 654 may also be disposed logically following the media files. Additionally, in situations in which part of the media stream 150 is not received by the media storage server 130, for instance due to poor connectivity, unavailability of the media storage server 130, or the like, the presence of the copies of the sets of parameters 624, 634, 644, 654 prior to the media files 622, 632, 642, 652 may serve as a backup in the event that the copies of the sets of parameters 624, 634, 644, 654 stored following the media files 622, 632, 642, 652 are not received by the media storage server 130. It should be understood that the sets of parameters stored in the metadata field 614 are substantially identical to the copies of the sets of parameters 624, 634, 644, 654 stored in the payload field 612. For example, the sets of parameters stored in the metadata field 614 may be stored in a compressed format, whereas the copies of the sets of parameters 624, 634, 644, 654 stored in the payload field 612 may be stored in an uncompressed format, even though the actual sets of parameters stored both the payload field 612 and the metadata field 614 are identical.

Figure 6B:
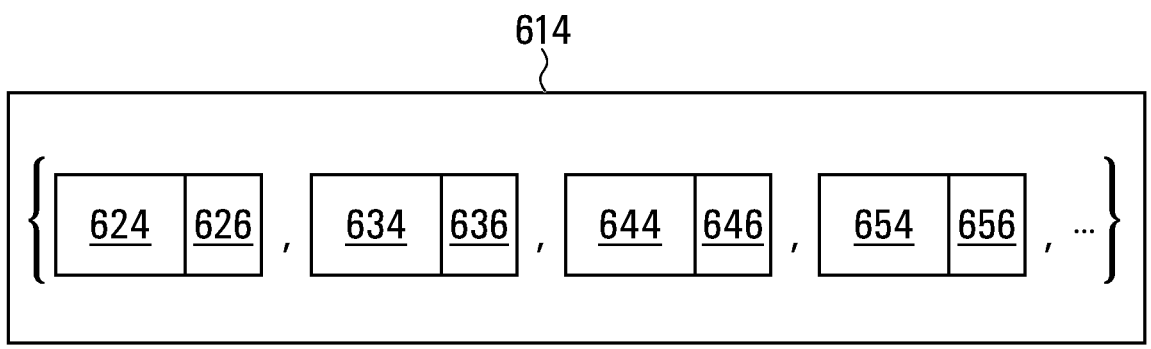
FIG. 6B is a graphical representation of an example implementation of the metadata field of the data structure of FIG. 6A.

With additional reference to FIG. 6B, in some embodiments, the metadata field 614 stores, in addition to the sets of parameters 624, 634, 644, 654, file length values 626, 636, 646, 656 (which may replace, or be stored in addition to, any file lengths 525 which may already be part of the sets of parameters 624, 634, 644, 654). In some embodiments, including the embodiment illustrated in FIG. 6B, the metadata field 614 stores concatenations of the sets of parameters 624, 634, 644, 654 and respective file length values 626, 636, 646, 656 in an array or similar structure. For example, the set of parameters 624 is concatenated with the file length value 626, the set of parameters 634 is concatenated with the file length value 636, and so on, as different entries in the array stored in the metadata field 614. For instance, if the file length 525 is already present within the sets of parameters 624, 634, 644, 654, the file length values 626, 636, 646, 656 can be obtained from the sets of parameters 624, 634, 644, 654 and then concatenated thereto. The file lengths 525 may then be removed from the sets of parameters 624, 634, 644, 654, or the sets of parameters 624, 634, 644, 654 may be left intact, as appropriate.

By including the file length values 626, 636, 646, 656 in the metadata field 614, the media storage server 130 can look to the metadata field 614 to determine which of the media files 622, 632, 642, 652 to serve to a requestor who specifies a particular portion of a requested media stream. Put differently, if a user requests that the media storage sever 130 provide a media stream at a time of 00:13:37 (i.e., 13 minutes and 37 seconds), the media storage server 130 can use the file length values 626, 636, 646, 656 to determine which of the media files 622, 632, 642, 652 should be served to the user to provide the user with the media stream at the requested time. In this fashion, the metadata field 614 can be used as a seek table to facilitate locating and streaming relevant media to requestors. In some embodiments, the metadata field 614 can include additional information, such as the location of one or more keyframes within the media files 622, 632, 642, 652, or the like, to facilitate playback of the media files 622, 632, 642, 652.

Figure 7:
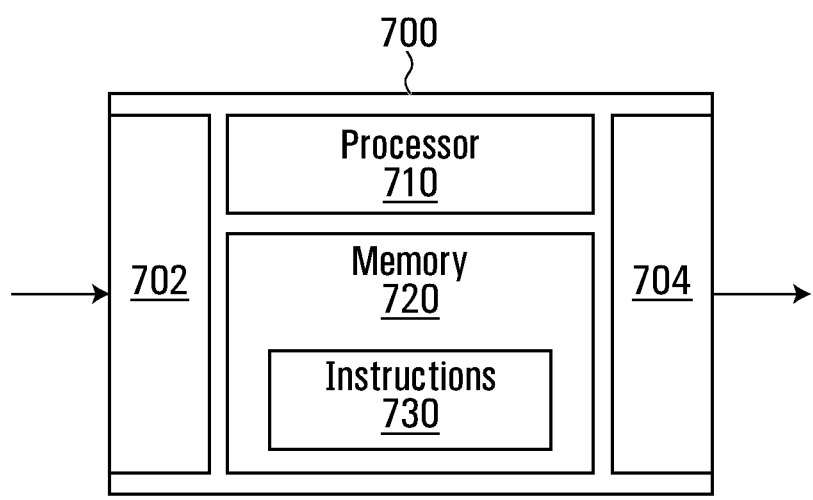
FIG. 7 is a block diagram of an example computing system.

With reference to FIG. 7, there is illustrated a schematic diagram of an example computing device 700. As depicted, the computing device 700 includes at least one processor 710, a memory 720, and program instructions 730 stored within the memory 720, as well as input and output interfaces (I/O interfaces) 702 and 704, respectively. For simplicity, only one computing device 700 is shown; the media sources 105, the media storage server 130, and/or any other computing devices included as part of other elements of the present disclosure (e.g., subcomponents or sensors of the camera 110) may be embodied by one or more implementations of the computing device 700, which may be the same or different types of devices. The components of the computing device 700 may be connected in various ways including directly coupled, indirectly coupled via a network, and distributed over a wide geographic area and connected via a network, for instance via a cloud computing implementation.

The I/O interfaces 702, 704 may include one or more media interfaces, via which removable media or other data sources may be coupled, one or more network interfaces, or any other suitable type of interface. The I/O interfaces 702, 704 of the computing device 700 may additionally, in some embodiments, provide interconnection functionality to one or more input devices, such as a keyboard, mouse, camera, touch screen and a microphone, or with one or more output devices such as a display screen and a speaker, for instance devices via which a user may interact with the media storage server 130. In embodiments in which the I/O interfaces 702, 704 include one or more network interfaces, the network interface(s) of the computing device 700 may enable the computing device 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The processor 710 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The processor 710 may be configured for executing the instructions 730 stored within the memory 720. The memory 720 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically erasable programmable read-only memory (EEPROM), Ferroelectric RAM (FRAM) or the like.

In certain embodiments, the computing device 700 is operable to register and authenticate users (using a login, unique identifier, and password for example) prior to providing access to applications, a local network, network resources, other networks, and network security devices. The computing device 700 may serve one user or multiple users.

For example, and without limitation, the computing device 700 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and/or implementing the systems described herein.

Figure 8:
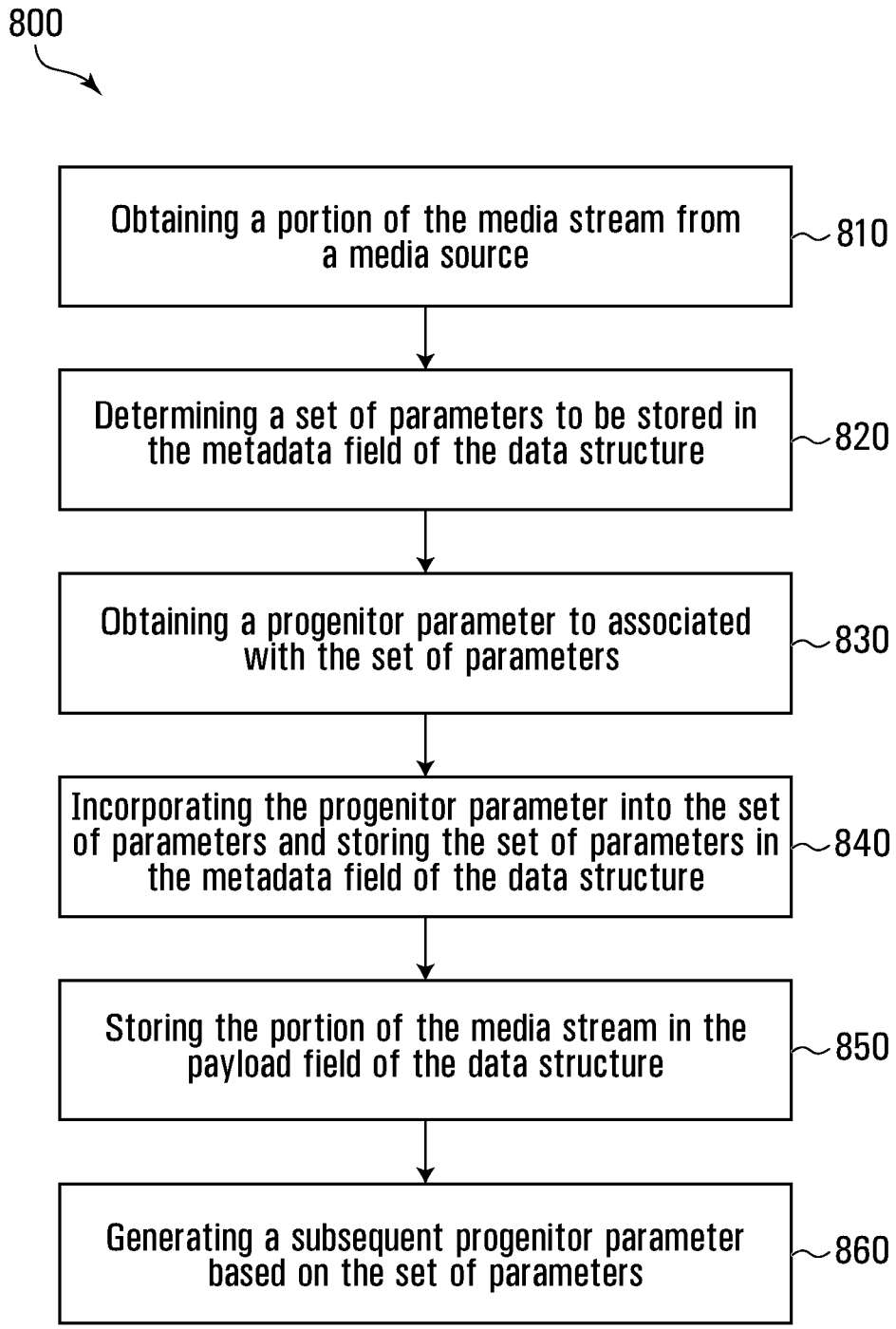
FIG. 8 is a flowchart illustrating an example method for tamper-evident storage of a media stream.

With reference to FIG. 8, there is illustrated a flowchart of a method 800 for tamper-evident storage of a media stream, for instance the media stream 150. In some embodiments, the method 800 may be implemented in a cloud-based environment. The method 800 may be performed using data structures, for instance the data structures 310, 320, 330 of the data architecture 300, which comprise a payload field and an associated metadata field. In some embodiments, the method 800 is performed, in whole or in part, by one of the media sources 105, for instance the camera 110, the microphone 120, or another media device, including devices which produce original media. In some other embodiments, the method 800 is performed, in whole or in part, by the media storage server 130, or by a utility operating thereon or in concert therewith, for instance a media archiver, which may operate on the media storage server 130 or on another device, for instance coupled to the media source 105 and to the media storage server 130. In some further embodiments, the method 800 is performed collaboratively by the media source 105, the media storage server 130 (and/or any utility operating thereon, for instance a media archiver), and/or by any other entity forming part of the media streaming system 100. It should be understood that the steps described hereinbelow forming part of the method 800 need not be performed in any particular order, unless otherwise specified.

As part of step 810, the method 800 comprises obtaining a portion of the media stream from a media source, for instance a part of the media stream 150 from one of the media sources 105. In some embodiments, obtaining the media source is performed by acquiring the portion of the media stream as original media, for instance via a sensor or transducer of the media source 105. The obtained media may be any suitable type of media, including images, video media, audio media, haptic media, or any suitable combination thereof.

As part of step 820, the method 800 comprises determining a set of parameters to be stored in the metadata field of the data structure, for instance the set of parameters 414 to be stored in the metadata field 314 of the data structure 310. The set of parameters 414 is associated with the portion of the media stream, which is to be stored in the payload field of the data structure 310, for instance the payload field 312.

In some embodiments, determining the set of parameters 414 includes generating an identifying hash of the portion of the media stream 150, for instance the file hash 520. In some embodiments, the file hash 520 may be generated via incremental hashing. In some embodiments, determining the set of parameters 414 includes obtaining a digital signature, for instance the signature 530, based on the portion of the media stream and on a cryptographic key. The signature 530 may be obtained using any suitable signing scheme, and which may vary based on the implementation, and may involve signing any suitable portion of the media filed 412, for instance part or all of the file hash 520. In some cases, the signature 530 is obtained using a cryptographic key associated with the media source 105, for instance a private encryption key of the camera 110 or the microphone 120. In some other cases, the signature 530 is obtained using a cryptographic key associated with the media storage server 130 or another entity associated therewith, for instance a media archiver, a gateway or bridge device, and/or a utility operating on the media storage server 130. In some further cases, the signature 530 is obtained using a cryptographic key associated with a user, for instance as stored in a Yubikey™ or other physical security token. Other approaches for obtaining the signature 530 are also considered.

As part of step 830, the method 800 comprises obtaining a progenitor parameter to associated with the set of parameters 414, for instance the progenitor parameter 512. The progenitor parameter 512 is based on a hash of at least part of a previous data structure which stores a previous portion of the media stream, and which was previous rendered tamper-evident. In some embodiments, the progenitor parameter 512 is based on a hash of a previous set of parameters associated with the previous portion of the media stream, for instance as stored in a payload field of the previous data structure. For instance, the progenitor parameters 512 may be based on a hash of the payload field of the previous data structure, which may include an identifying hash of the previous portion of the media stream, as stored in the payload field of the previous data structure.

As part of step 840, the method 800 comprises incorporating the progenitor parameter 512 into the set of parameters 414 and storing the set of parameters 414 in the metadata field 314 of the data structure 310. In some embodiments, the set of parameters 414 is compressed, using any suitable compression algorithm, prior to being stored in the metadata field 314 as a compressed set of parameters. In some embodiments, storing the set of parameters 414 in the metadata field 314 of the data structure 310 includes indirectly storing the set of parameters 414, for example by storing an indirection in the metadata field 314, which points to another file or data location, at which the set of parameters 414 are stored. The indirection may be of any suitable format, and may depend on the particulars of the file system used to implement the data architecture 300.

As part of step 850, the method 800 comprises storing the portion of the media stream 150 in the payload field 312 of the data structure 310. In some embodiments, as part of step 850, one or more copies of the set of parameters 414 is also stored in the payload field 312, for instance as copy 416. In some embodiments, multiple portions of the media stream 150 may be stored in a common payload field, for example the media files 622, 632, 642, 652 stored in the payload field 612. In these embodiments, multiple sets of parameters may also be stored in a common metadata field, for example the sets of parameters 624, 634, 644, 654 stored in the metadata field 614; storing the multiple sets of parameters 624, 634, 644, 654 may take place as part of step 830. In some cases, copies of the sets of parameters may also be stored in the payload field 612.

As part of step 860, the method 800 comprises generating a subsequent progenitor parameter based on the set of parameters 414, which, in some embodiments, includes an identifying hash of the portion of the media stream 150, for instance the file hash 520. The generating of the subsequent progenitor parameter is performed after step 840, as part of which the progenitor parameter 512 is incorporated into the set parameters 414 and may be performed before step 850, concurrently therewith, or thereafter, as appropriate. As a result, the subsequent progenitor includes therein the progenitor parameter 512, so that tampering with the progenitor parameter 512 would be detectable based on the subsequent progenitor parameter. The subsequent progenitor parameter may then be used in rendering a subsequent portion of the media stream 150 tamper-evident, for instance the portion of the media stream 150 stored as media file 422 in the data structure 320. It should be understood that different parts of the steps 840, 850, and 860, can be performed in any suitable order, as appropriate. For instance, As previously mentioned, in some embodiments, part or all of the method 800 is implemented by the media sources 105, for instance the camera 110. In one example implementation, the camera 110 in question is capable of running custom applications of various types in addition to any standard video and/or image collection functionality. To this end, the camera 110 provides hooks or other interfaces which allow for a custom application to run on and/or interact with the standard functionality of the camera 110. The hooks may include a "pull" hook, which enables the custom application to obtain, from the camera 110, original media produced by the camera 110. For instance, the custom application pulls the original media produced by the camera 110, which may be in MP4 format, and formats the media in accordance with the data architecture 300. The hooks may also include a "push" hook, which enables the custom application to supply, to the camera 110, additional information about the media produced by the camera 110. The additional information may be generated by the custom application, or obtained by the custom application, for instance from a web server or similar remote system (e.g., the media storage server 130). For instance, the custom application pushes parameters from the set of parameters relating to the media to the camera 110, so that the camera can bundle the parameters with the original media in accordance with the data architecture 300. In this fashion, the custom application running on the camera 110 can assist the camera in producing the media stream 150 in accordance with the data architecture 300, so that the media storage server 130 can take the data obtained from the media stream 150, which is already formatted in the appropriate format to be stored with the data architecture 300.

Figure 9:
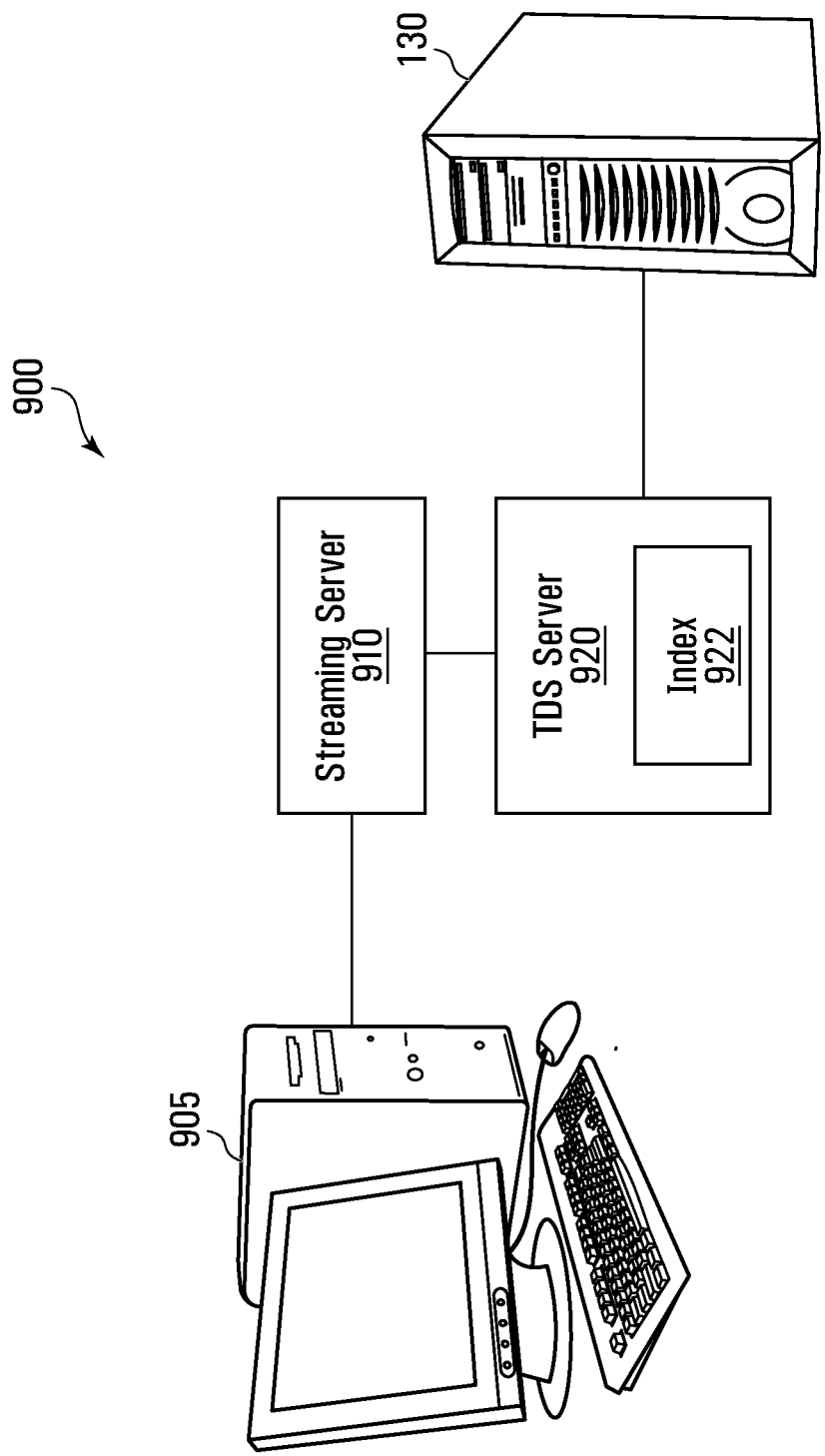
FIG. 9 is a schematic diagram of an example media streaming system.

With reference to FIG. 9, there is illustrated a media streaming system 900, which comprises a client device 905, a streaming server 910, a trusted delivery service (TDS) server 920, and the media storage server 130. In some embodiments, the media streaming system 900 may be an extension of the media streaming system 100, insofar as the media storage server 130 may concurrently receive media to store, in the form of the media stream 150, and also serve media to external devices, such as the client device 905. Although illustrated here as separate servers, it should be understood that the streaming server 910, the TDS server 920, as well as the media storage server 130 need not be separate physical servers. Rather, one or more of the streaming server 910, the TDS server 920, and the media storage server 130 may be implemented by one or more common physical servers. Additionally, or in the alternative, one or more of the streaming server 910, the TDS server 920, and the media storage server 130 may be implemented by a plurality of physical servers, in a distributed server arrangement, or the like, as appropriate.

The client device 905 may be any suitable type of device via which a user can request access to media stored in the media storage server 130. The client device 905 may be a conventional desktop computer, a laptop computer, a portable electronic device (e.g., a smartphone), or any other suitable type of computing device. The client device 905 can request media from the media storage server 130 in any suitable fashion: the client device 905 may specify the name or other identifier of a particular media source 105, a particular date and time, a location of interest, and the like.

The request for media from the media storage server 130 is received at a streaming server 910. The streaming server 910 is configured for interpreting the request from the client device 905, and for providing media to the client device 905 in a format suitable for the client device 905. To this end, the streaming server 910 may employ a suitable streaming protocol, for instance HTTP Live Streaming (HLS), Dynamic Adaptive Streaming over HTTP (also known as MPEG-DASH), or the like, to serve video to the client device 905. In some embodiments, upon receipt of the request from the client device 905, or at a suitable time thereafter, the streaming server 910 provides the client device 905 with a playlist composed of one or more universal resource indicators (URIs) which point to the streaming server 910, for instance to obfuscate the actual source of media (e.g., the media storage server 130).

The streaming server 910 consults the TDS server 920 to identify the appropriate portions of the data architecture 300 from which to obtain the media requested by the client device 905. To this end, the TDS server 920 maintains an index 922, which is based on the sets of parameters stored in the metadata fields 314, 324, 334 of the data structures 310, 320, 330 of the data architecture 300. Although referred to as an "index", it should be understood that the index 922 may include other information than what would conventionally be understood to be contained in an index. For example, the index 922 may include information relating to the different media sources 105, to the times and places from which media was acquired, and the like. In some cases, the index 922 includes copies of parts or all of the information stored in the metadata fields of the data structures 310, 320, 330, that is to say, copies of the sets of parameters for the media files of the data structures 310, 320, 330. Using the index 922, the streaming server 910 can identify the appropriate one of the data structures 310, 320, 330 from which to obtain the media to be provided to the client device 905 without needing to query the metadata fields 314, 324, 334 of the data structures 310, 320, 330 in response to the request from the client device 905. In some embodiments, the streaming server 910 and/or the TDS server 920 may nevertheless query the metadata fields 314, 324, 334 of the data structures 310, 320, 330, for instance to validate the index 922, to account for the index 922 being incomplete, or in cases in which the index 922 is not yet available.

Based on the index 922, the TDS server 920 accesses the appropriate data structure(s) of the data architecture 300, stored in the media storage server 130, and provides the media to the streaming server 910, for instance part or all of the media file 412. Alternatively, the streaming server 910 can identify the appropriate data structure(s) of the data architecture 300, stored in the media storage server 130, to obtain the media, for instance part or all of the media file 412. The streaming server 910 then serves the media file 412 to the client device 905, for instance after converting or otherwise transforming the media file 412 to facilitate the transfer and/or streaming thereof. In some embodiments, the TDS server 920 can also provide, or the streaming server 910 can obtain, part or all of the set of parameters 414, associated with the media file 412, to the client device 905. For example, once the TDS server 920 identifies the appropriate data structure(s), the TDS can obtain both the media file 412 and the set of parameters 414, and provide both the streaming server 910. The streaming server 910 may format the media file 412 and the set of parameters 414 by placing the set of parameters 414 in the header of one or more streams provided to the client device 905. In cases in which the client device 905 is configured for interpreting or otherwise making use of the set of parameters 414, the client device 905 may use the set of parameters to facilitate playback of the media file 412, to obtain identifying information about the media file 412, to validate one or more aspects of the media file 412, and the like. In cases in which the client device 905 is not configured for interpreting or otherwise making use of the set of parameters 414, the header of the stream provided from the streaming server 910 to the client device 905 can be ignored by the client device 905.

In some embodiments, the media provided to the client device 905 is encrypted. In some embodiments, the encryption was performed at the time of acquisition, for instance by the media source 105. In some other embodiments, the encryption was performed at the time of storage in the media storage server 130, for instance by the media storage server 130, or by another device antecedent to the media storage server 130. In some further embodiments, the encryption is performed as part of the media delivery process (i.e., to the client device 905), for instance by the media storage server 130, the TDS server 920, the streaming server 910, or any other suitable device. In still further embodiments, the encryption is performed at any other suitable time, and by any other suitable entity. For example, the encryption may be a conventional encryption performed as part of the process of generating the media file 412, for instance generating the one or more .MP4 files which compose the media file 412.

In order to perform playback or otherwise use the provided media, the client device 905 is provided with the necessary decryption mechanisms (e.g., one or more cryptographic keys or "decryption keys") for decrypting the media it obtains from the streaming server 910. In some embodiments, the media file 412 is encrypted symmetrically, for example in cases in which the media file 412 includes video media. To enable the client device 905 to perform playback of the media file 412, the client device 905 is provided with the requisite symmetric encryption key (i.e., the same symmetric encryption key which was used to encrypt the media file 412). The symmetric encryption key can be provided to the client device 905 in any suitable fashion, for example as part of serving the media file to the client device 905, included in a header or other metadata portion of the packets providing the media file 412 to the client device 905, or the like. In some cases, the symmetric encryption key used is a symmetric encryption key generated by or otherwise associated with the media source 105 which produced the media stream 150 which was thereafter stored as the media file 412. The symmetric encryption key may then be stored in a secure repository (e.g., Azure® Key Vault™), which may form part of the media storage server 130, or may be a separate server, as appropriate. For instance, the media source 105 may periodically generate new symmetric encryption keys for encrypting the media stream 150, and transfer, alongside the media stream 150 or separate therefrom, the symmetric encryption keys for storage, whether in the media storage server 130 or in a separate repository. Other approaches are also considered. For example, for other types of media, the media stream 150 and the media file 412 may be encrypted asymmetrically, and depending on the implementation, different encryption keys may be used. For example, the media stream 150 may be encrypted by the media source 105 using a public encryption key of the media storage server 130, or of another entity involved in the media storage process (e.g., the 135). Upon request to serve a portion of the media stream 150, the media storage server 130 may use its private encryption key to decrypt the relevant media file 412, then use the public encryption key of the client device 905 to re-encrypt the media file 412, so that only the client device 905 can decrypt the media file 412. Other approaches are also considered.

In some embodiments, the symmetric encryption key can itself be encrypted prior to being provided to the client device 905, for instance to ensure that unauthorized parties cannot decrypt the media file 412. For example, the symmetric encryption key can be encrypted asymmetrically, for instance using the public encryption key of the media storage server 130 (or of another entity involved in the media storage process, e.g., the 135), prior to or as part of storage of the media stream 150 within the media storage server 130. In this fashion, only the media storage server 130 can decrypt the symmetric encryption key used to encrypt the media stream 150. Then, when the client device 905 requests a particular portion of the media stream 150, the media storage server 130 can decrypt the relevant symmetric encryption key, using its own private encryption key, to obtain the decrypted symmetric encryption key. The media storage server 130 can then provide the symmetric encryption key as—is, or re-encrypt it, for instance using the public encryption key of the client device 905, so that only the client device 905, using its private encryption key, can decrypt the symmetric encryption key needed to then decrypt the media file 412. Other approaches are also considered.

In some embodiments, the TDS server 920 may also be responsible for managing the flow of media streams 150 from media sources 105 to the media storage server 130. To this end, the TDS server 920 may be coupled to one or more of the media sources 105 for providing instructions thereto, or may send commands to the media sources 105 via the media storage server 130. The media storage server 130, which may be composed of a number of virtual servers, may be a distributed server, or the like, may need to manage a total storage capacity of the media storage server 130, a maximum number of concurrently received media streams 150, or the like. The TDS server 920 can issue instructions to different ones of the media sources 105 indicating particular targets for the media streams 150 produced by the media sources 105, for instance to facilitate load balancing on the media storage server 130, to account for differing tiers or importance levels of the media streams 150 produced by the media sources 105, or the like.

Figure 10:
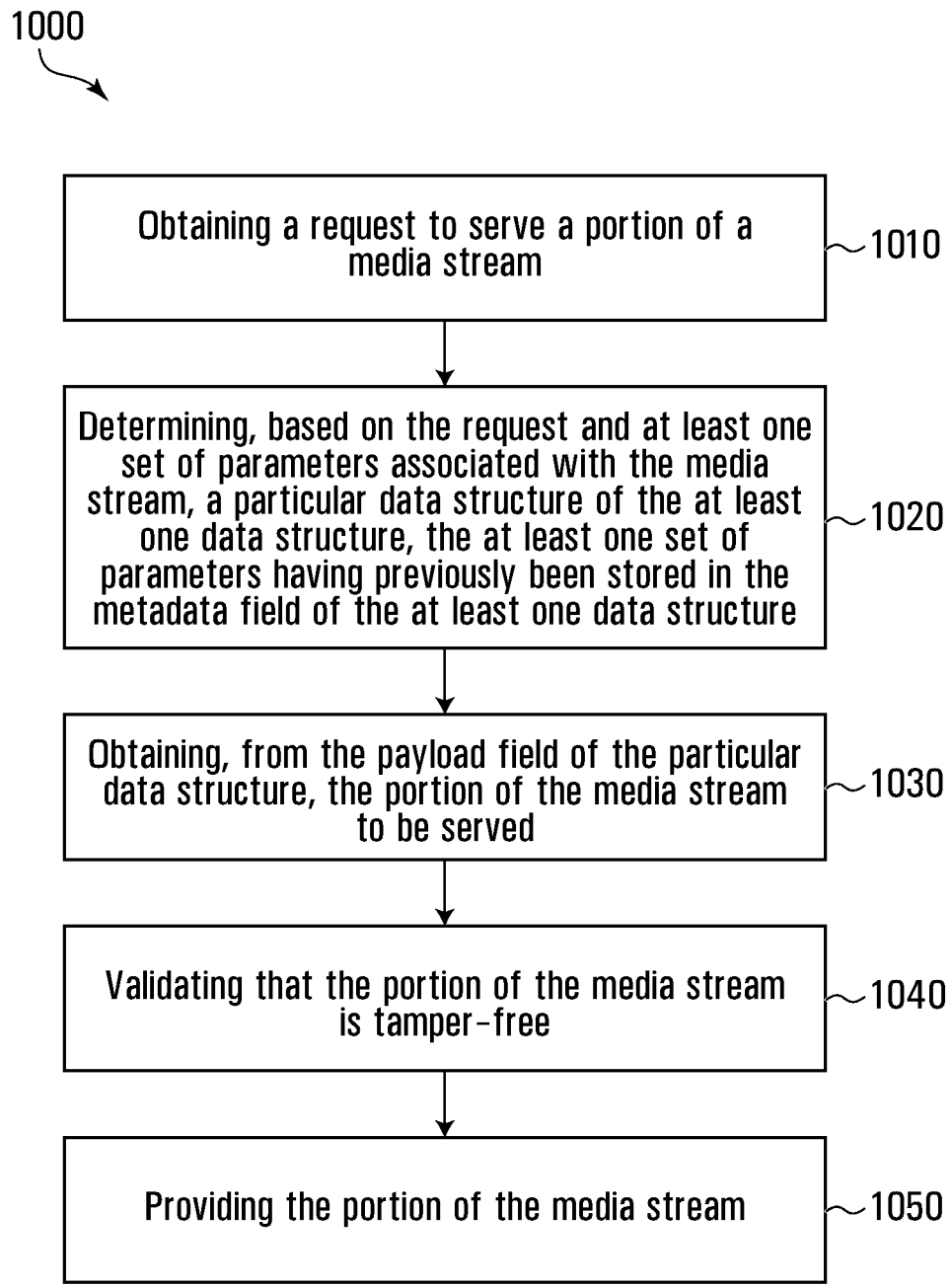
FIG. 10 is a flowchart illustrating an example method for serving tamper-evident media.

With reference to FIG. 10, there is illustrated a method 1000 for serving tamper-evident media to a user or other entity requesting the media. In some embodiments, the method 1000 may be implemented in a cloud-based environment. The method 1000 may be performed using data structures, for instance the data structures 310, 320, 330 of the data architecture 300, which comprise a payload field and an associated metadata field. It should be understood that the steps described hereinbelow forming part of the method 1000 need not be performed in any particular order, unless otherwise specified.

As part of step 1010, the method 1000 comprises obtaining a request to serve a portion of a media stream. The request may come from a user or other party, for instance from the client device 905, and may provide various information specifying the portion of the media stream desired. For example, the user may request a video stream from a particular camera (e.g., camera 012) at a particular time (e.g., 2:00:00 PM on Jun. 16, 2015).

As part of step 1020, the method 1000 comprises determining, based on the request and at least one set of parameters associated with the media stream, a particular data structure of the at least one data structure, the at least one set of parameters having previously been stored in the metadata field of the at least one data structure. The particular one of the data structures 312, 322, 332 is determined based on the portion of the media stream 150 stored in its payload field being relevant to the request of the user (e.g., containing the requested media). In some embodiments, this determination is made based on an index generated from the metadata fields of the data structure(s), for instance the index 922. In some other embodiments, the sets of parameters stored in the data structure 310, 320, 330 are used to determine a particular one of the data structures 310, 320, 330. In embodiments in which the metadata fields include a seek table or similar data, determining the particular data structure to be served may include consulting the seek table, which may be stored in the metadata field, and/or which may be replicated in the index 922. For example, in embodiments in which a plurality of portions of the media stream are stored in a common payload field of a single data structure (e.g., the media files 622, 632, 642, 652 in the data structure 610), the seek table present in the metadata field 614 and/or replicated in the index 922 may be used to find the appropriate data structure and/or the appropriate one of the media files 622, 632, 642, 652. As a result, determining the appropriate one of the multiple portions of the media stream to provide is based on the request obtained at step 910, and on the multiple sets of parameters (e.g., stored in the metadata field 614 or as copies within the payload field 612), each of which is associated with respective ones of the media files 622, 632, 642, 652.

As part of step 1030, the method 1000 comprises obtaining, from the payload field of the particular data structure, the portion of the media stream to be served. For example, if the data structure 310 is determined to be the particular data structure, the media file 412 is obtained from the payload field 312 of the data structure 310, for instance by the TDS server 920.

In some embodiments, as part of step 1040, the method 1000 comprises validating that the portion of the media stream is tamper-free. In some embodiments, validating that the portion of the media stream is tamper-free is performed by comparing a progenitor parameter stored as part of the set of parameters in the metadata field, the progenitor parameter based on a hash of at least part of a previous data structure storing a previous portion of the media stream, with a newly generated progenitor parameter generated based on the at least part of the previous data structure, the previous data structure having previously been rendered tamper-evident. In some other embodiments, validating that the portion of the media stream is tamper-free is performed by verifying a signature associated with the portion of the media stream, for instance the signature 530. Validation of the signature 530 can be performed by using a certificate associated with the signature 530, for instance a certificate belonging to the entity which produced the signature 530. Other approaches to validating the portion of the media stream are also considered, including those described hereinabove, and can be performed by the streaming server 910, by the media storage server 130, by the client device 905, or by any other suitable device. If the portion of the media stream is found to have been tampered with, or if other evidence of tampering is found to have occurred (e.g., with the set of parameters, or with other information stored in the metadata field), an alert can be raised, a notification can be issued to the requestor, and in some cases, the method 1000 may stop without providing the requested media to the requestor.

As part of step 1050, the method 1000 comprises providing the portion of the media stream, for example in the form of providing the media file 412, for instance by the streaming server 910. The media file 412 may be provided to the user or relevant party over a network, or may be caused to be presented on a display associated, for instance, with the media storage server 130. Other approaches for providing the portion of the media stream are also considered. In some embodiments, including in embodiments in which a plurality of portions of the media stream are stored in a common payload field of a single data structure (e.g., the media files 622, 632, 642, 652 in the data structure 610), a copy of the relevant set of parameters for the particular data structure may also be provided with the portion of the media stream to be served, which may be obtained from the payload field. For example, the relevant set of parameters may be stored in a header field of a stream used to provide the relevant media file to the client device 905.

Although the present disclosure focuses primarily on systems and methods for storage of tamper-evident media and provisioning of the same, the embodiments described herein may also be applied to other fields of endeavor. For instance, other types of data may be similarly stored and rendered tamper-evident.

The embodiments of the methods, systems, devices, and computer-readable media described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory computer-readable storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and at least some of the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions, and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

The invention claimed is:

1. A method for tamper-evident storage of a media stream using a data structure comprising a payload field and an associated metadata field, the method comprising:
   obtaining a portion of the media stream from a media source;
   determining a set of parameters to be stored in the metadata field of the data structure, the set of parameters associated with the portion of the media stream to be stored in the payload field of the data structure;
   obtaining a progenitor parameter to associate with the set of parameters by hashing a metadata field, defining a previous set of parameters associated with a previous portion of the media stream, from a previous data structure storing the previous portion of the media stream, the previous data structure having previously been rendered tamper-evident;
   incorporating the progenitor parameter into the set of parameters and storing the set of parameters in the metadata field of the data structure; and
   storing the portion of the media stream in the payload field of the data structure.

2. The method of claim 1, wherein said determining the set of parameters associated with the portion of the media stream comprises generating at least an identifying hash of the portion of the media stream.

3. The method of claim 2, comprising generating a subsequent progenitor parameter based on the set of parameters, including the identifying hash of the portion of the media stream, after said incorporating the progenitor parameter therein, the subsequent progenitor parameter for use in rendering a subsequent portion of the media stream tamper-evident.

4. The method of claim 2, wherein said generating the identifying hash of the portion of the media stream is performed incrementally as the portion of the media stream is obtained from the media source.

5. The method of claim 1, wherein said obtaining the progenitor parameter being based on a hash of a previous set of parameters associated with the previous portion of the media stream comprises the progenitor parameter being based on a hash of a metadata field of the previous data structure storing the previous portion of the media stream.

6. The method of claim 1, wherein said obtaining the progenitor parameter being based on a hash of a previous set of parameters associated with the previous portion of the media stream comprises the progenitor parameter being based on a hash of the previous portion of the media stream present in the previous set of parameters associated with the previous portion of the media stream.

7. The method of claim 1, comprising, after said incorporating the progenitor parameter into the set of parameters and said storing the set of parameters in the metadata field of the data structure, generating a subsequent progenitor parameter based on the metadata field of the data structure for use in rendering a subsequent portion of the media stream tamper-evident.

8. The method of claim 1, wherein said determining the set of parameters comprises obtaining a digital signature based on the portion of the media stream and a cryptographic key associated with one of the media source, a media archiver performing said storing the set of parameters and the portion of the media stream, and a user authorizing the tamper-evident storage of the media stream.

9. The method of claim 1, wherein said storing the set of parameters in the metadata field of the data structure comprises:
   storing an indirection in the metadata field; and
   storing the set of parameters in a file separate from the data structure, wherein the indirection points to the file to render the set of parameters accessible via the metadata field.

10. The method of claim 1, wherein said storing the set of parameters in the metadata field comprises:
    applying a compression algorithm to the set of parameters to produce a compressed set of parameters; and
    storing the compressed set of parameters in the metadata field.

11. The method of claim 1, comprising storing a copy of the set of parameters in the payload field in association with the portion of the media stream.

12. The method of claim 1, wherein the data structure is configured for storing multiple portions of the media stream, wherein said storing the set of parameters in the metadata field of the data structure comprises storing the set of parameters in the metadata field alongside a previous set of parameters associated with the previous portion of the media stream, and wherein said storing of the portion of the media stream comprises storing the portion of the media stream in the payload field alongside the previous portion of the media stream.

13. The method of claim 12, comprising storing a copy of the set of parameters in the payload field in association with the portion of the media stream alongside a copy of the previous set of parameters also stored in the payload field, in association with the previous portion of the media stream.

14. The method of claim 1, wherein said obtaining the portion of the media stream from the media source comprises acquiring the portion of the media stream as original media.

15. A system for tamper-evident storage of a media stream in a cloud-based environment using a data structure comprising a payload field and an associated metadata field, the system comprising:
    a processor; and
    a non-transitory computer-readable medium storing thereon instructions executable by the processor for causing the system to perform:
       obtaining a portion of the media stream from a media source;
       determining a set of parameters to be stored in the metadata field of the data structure, the set of parameters associated with the portion of the media stream to be stored in the payload field of the data structure;
       obtaining a progenitor parameter to associate with the set of parameters by hashing a metadata field, defining a previous set of parameters associated with a previous portion of the media stream, from a previous data structure storing the previous portion of the media stream, the previous data structure having previously been rendered tamper-evident;
       incorporating the progenitor parameter into the set of parameters and storing the set of parameters in the metadata field of the data structure; and
       storing the portion of the media stream in the payload field of the data structure.

16. A method for serving tamper-evident media, the media having previously been stored using at least one data structure comprising a payload field and an associated metadata field, the method comprising:
    obtaining a request to serve a portion of a media stream;

determining, based on the request and at least one set of parameters associated with the media stream, a particular data structure of the at least one data structure, the at least one set of parameters having previously been stored in the metadata field of the at least one data structure;

obtaining, from the payload field of the particular data structure, the portion of the media stream to be served;

validating that the portion of the media stream is tamper-free by comparing a progenitor parameter stored as part of the set of parameters in the metadata field, the progenitor parameter having been obtained by hashing a metadata field of a previous data structure storing a previous portion of the media stream, with a newly generated progenitor parameter generated based on the metadata field of the previous data structure, the previous data structure having previously been rendered tamper-evident; and providing the portion of the media stream.

17. The method of claim 16, wherein said determining the particular data structure to be served comprises consulting a seek table stored in the metadata field.

18. The method of claim 16, wherein said determining the particular data structure to be served comprises consulting an index generated based on the at least one set of parameters having previously been stored in the metadata field of the at least one data structure.

19. The method of claim 18, comprising, following said consulting the index generated based on the at least one set of parameters, validating the particular data structure to be served based on consulting the at least one set of parameters having previously been stored in the metadata field of the at least one data structure.

20. The method of claim 16, wherein a plurality of portions of the media stream are stored in a common payload field of a single data structure, the method comprising determining, based on the request and a plurality of sets of parameters associated with respective ones of the plurality of portions of the media stream, a particular one of the portions of the media stream to be provided.

21. The method of claim 16, comprising comparing a plurality of progenitor parameters for each of a plurality of data structures storing the media with a plurality of newly generated progenitor parameters, wherein the plurality of progenitor parameters comprises the progenitor parameters, and wherein the plurality of data structures comprises the at least one data structure.

22. The method of claim 16, wherein said validating that the portion of the media stream is tamper-free comprises verifying a signature associated with the portion of the media stream.

23. The method of claim 16, wherein said validating that the portion of the media stream is tamper-free comprises comparing a hash of the portion of the media stream stored as part of the set of parameters in the metadata field with a newly generated hash of the media stream.

24. A system serving tamper-evident media, the media having previously been stored using at least one data structure comprising a payload field and an associated metadata field, the system comprising:

a processor; and a non-transitory computer-readable medium storing thereon instructions executable by the processor for causing the system to perform:

obtaining a request to serve a portion of a media stream;

determining, based on the request and at least one set of parameters associated with the media stream, a particular data structure of the at least one data structure, the at least one set of parameters having previously been stored in the metadata field of the at least one data structure;

obtaining, from the payload field of the particular data structure, the portion of the media stream to be served;

validating that the portion of the media stream is tamper-free by comparing a progenitor parameter stored as part of the set of parameters in the metadata field, the progenitor parameter having been obtained by hashing a metadata field of a previous data structure storing a previous portion of the media stream, with a newly generated progenitor parameter generated based on the metadata field of the previous data structure, the previous data structure having previously been rendered tamper-evident; and providing the portion of the media stream.

* * * * *